(12) United States Patent
Yamaguchi

(10) Patent No.: US 11,662,261 B2
(45) Date of Patent: May 30, 2023

(54) SENSOR CHIP AND FORCE SENSOR DEVICE WITH INCREASED FRACTURE RESISTANCE

(71) Applicant: MINEBEA MITSUMI Inc., Nagano (JP)

(72) Inventor: Shinya Yamaguchi, Tokyo (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 17/644,375

(22) Filed: Dec. 15, 2021

(65) Prior Publication Data

US 2022/0205856 A1 Jun. 30, 2022

(30) Foreign Application Priority Data

Dec. 24, 2020 (JP) .............................. JP2020-215554

(51) Int. Cl.
*G01L 1/18* (2006.01)
*G01L 5/162* (2020.01)

(52) U.S. Cl.
CPC ............... *G01L 5/162* (2013.01); *G01L 1/18* (2013.01)

(58) Field of Classification Search
CPC ... G01L 1/2212; G01L 1/2262; G01L 5/1627; G01L 1/2287; G01L 5/226; G01L 5/162; G01L 1/18; G01L 1/2206; G01B 7/18
See application file for complete search history.

(56) References Cited

U.S. PATENT DOCUMENTS

| 4,448,083 A | * | 5/1984 | Hayashi | G01L 5/1627 |
| | | | | 73/862.042 |
| 4,635,479 A | * | 1/1987 | Salisbury, Jr. | B25J 13/02 |
| | | | | 73/862.045 |
| 5,222,400 A | * | 6/1993 | Hilton | G01L 1/248 |
| | | | | 73/862.05 |

(Continued)

FOREIGN PATENT DOCUMENTS

| DE | 102016212407 | 1/2018 |
| EP | 3748322 | 12/2020 |

(Continued)

OTHER PUBLICATIONS

Extended European Search Report dated May 11, 2022 with respect to the corresponding European patent application No. 21215437.1.

*Primary Examiner* — Tran M. Tran
(74) *Attorney, Agent, or Firm* — IPUSA, PLLC

(57) ABSTRACT

A sensor chip includes multiple sensing blocks each of which includes two or more T-patterned beam structures. Each T-patterned beam structure includes strain-detecting elements, at least one first detection beam, and a second detection beam extending from the first detection beam in a direction perpendicular to the first detection beam. Each T-patterned beam structure includes a connection portion formed by coupling ends of second detection beams in respective T-patterned structures, the connection portion including a force point portion. The sensor chip is configured to detect up to six axes relating to predetermined axial forces or moments around the predetermined axes, based on a change in an output of each of the strain-detecting elements, the output of each strain-detecting element changing in accordance with an input applied to a given force point portion.

12 Claims, 24 Drawing Sheets

(56) References Cited

U.S. PATENT DOCUMENTS

| | | | | |
|---|---|---|---|---|
| 5,526,700 A * | | 6/1996 | Akeel | G01L 1/18 73/862.042 |
| 6,324,919 B1 * | | 12/2001 | Larsen | G01L 5/1627 73/862.043 |
| 6,532,830 B1 * | | 3/2003 | Jansen | G01L 5/1627 73/862.042 |
| 6,823,744 B2 | | 11/2004 | Ohsato | G01L 5/162 73/862.041 |
| 7,437,954 B2 * | | 10/2008 | Sakano | G01L 5/162 73/862.043 |
| 7,490,524 B2 * | | 2/2009 | Ohsato | G01L 5/162 73/862.629 |
| 7,536,922 B2 * | | 5/2009 | Sakurai | G01L 1/205 73/862.041 |
| 7,536,923 B2 * | | 5/2009 | Hirabayashi | G01L 5/162 73/862.041 |
| 7,594,445 B2 * | | 9/2009 | Hirabayashi | G01L 1/26 73/862.041 |
| 7,669,480 B2 * | | 3/2010 | Maekawa | G01L 5/1627 73/777 |
| 7,743,672 B2 * | | 6/2010 | Kurtz | G01L 5/1627 73/862.041 |
| 7,788,984 B2 * | | 9/2010 | Meyer | G01M 9/062 73/862.041 |
| 8,220,343 B2 * | | 7/2012 | Hatanaka | G01L 5/223 73/862.632 |
| 8,250,934 B2 * | | 8/2012 | Sakurai | G01P 15/18 73/862.041 |
| 8,607,646 B2 * | | 12/2013 | Ohsato | G01P 15/123 73/862.044 |
| 8,844,376 B2 * | | 9/2014 | Siklos | G01L 5/1627 73/862.045 |
| 9,038,484 B2 * | | 5/2015 | Seibold | G01L 5/1627 73/862.045 |
| 9,441,941 B2 * | | 9/2016 | Hwang | G01L 1/205 |
| 9,946,248 B2 * | | 4/2018 | Nakayama | G05B 19/4062 |
| 10,422,707 B2 * | | 9/2019 | Bradford | B25J 13/085 |
| 10,634,695 B2 * | | 4/2020 | Yamaguchi | G01L 1/2268 |
| 10,801,904 B2 * | | 10/2020 | Yamaguchi | G01L 1/2218 |
| 10,866,150 B2 * | | 12/2020 | Lauzier | G01L 1/14 |
| 11,085,842 B2 * | | 8/2021 | Suzuki | G01L 1/22 |
| 11,137,299 B2 * | | 10/2021 | Abbasi Gavarti | H01L 41/25 |
| 11,262,254 B2 * | | 3/2022 | Mukai | G01L 5/161 |
| 11,287,335 B2 * | | 3/2022 | Mukai | G01L 3/00 |
| 11,473,987 B2 * | | 10/2022 | Yamaguchi | G01L 1/2206 |
| 11,519,799 B2 * | | 12/2022 | Mukai | G01L 5/1627 |
| 2003/0140713 A1 * | | 7/2003 | Ohsato | G01L 5/162 73/862.041 |
| 2006/0130595 A1 * | | 6/2006 | Meyer | G01D 5/183 73/862.041 |
| 2010/0199783 A1 * | | 8/2010 | Sakurai | G01P 15/18 73/514.33 |
| 2015/0187961 A1 * | | 7/2015 | Kim | G01L 5/162 257/415 |
| 2017/0205296 A1 * | | 7/2017 | Bradford | G01L 5/1627 |
| 2017/0211999 A1 * | | 7/2017 | Bradford | B25J 13/085 |
| 2018/0310411 A1 * | | 10/2018 | Kasper | G01P 1/023 |
| 2019/0226929 A1 * | | 7/2019 | Suzuki | G01L 1/22 |
| 2020/0309617 A1 * | | 10/2020 | Mukai | G01L 3/00 |
| 2020/0309626 A1 * | | 10/2020 | Mukai | G01L 5/1627 |
| 2021/0293642 A1 * | | 9/2021 | Song | G01L 5/1627 |

FOREIGN PATENT DOCUMENTS

| | | |
|---|---|---|
| JP | 2003-254843 | 9/2003 |
| WO | 2014/057479 | 4/2014 |

* cited by examiner

FIG.18
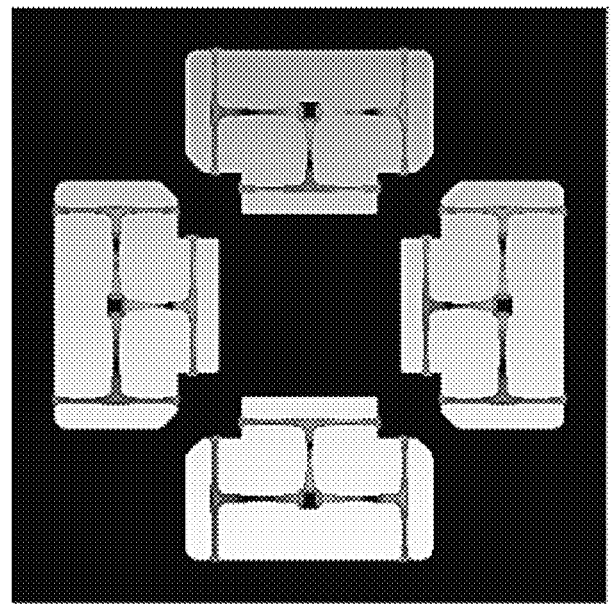
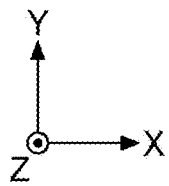
FIG.19
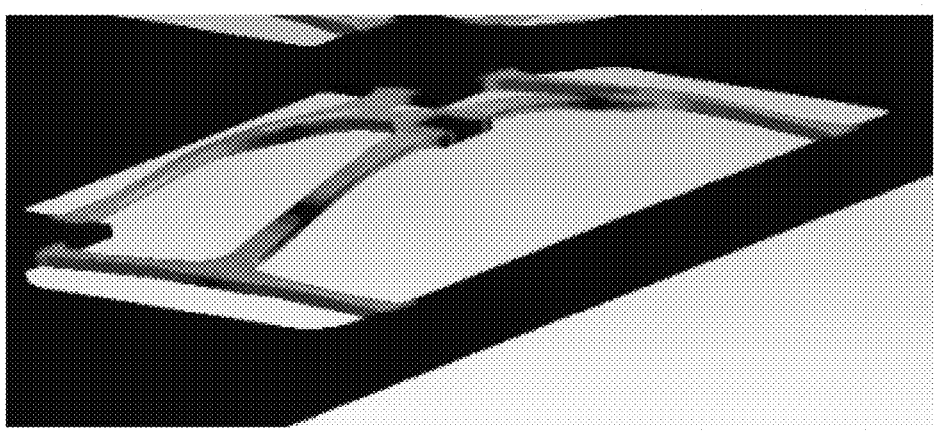
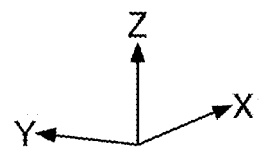

SENSOR CHIP AND FORCE SENSOR DEVICE WITH INCREASED FRACTURE RESISTANCE

CROSS-REFERENCE TO RELATED APPLICATION

This application claims priority under 35 U.S.C. § 119 to Japanese Patent Application No. 2020-215554, filed Dec. 24, 2020, the contents of which are incorporated herein by reference in their entirety.

BACKGROUND

1. Field of the Invention

The present disclosure relates to a sensor chip and a force sensor device.

2. Description of the Related Art

Force sensor devices for detecting displacements in one or more predetermined axial directions have been known. As an example of such a force sensor device, a force sensor device includes a structure including (i) a sensor chip, (ii) an external force receiving plate that is disposed around the sensor chip and to which an external force is applied, (iii) a base that supports the sensor chip, (iv) an external force-buffering mechanism that secures the external force receiving plate to the base, and (v) a coupling rod that is an external force-transmitting mechanism, where the external force receiving plate and an effect portion are coupled to each other by the coupling rod.

The sensor chip includes (i) the effect portion that is substantially square-shaped and is located in a central portion, (ii) a ring-shaped support that is square at a location surrounding the effect portion, and (iii) four T-shaped coupling portions that are each located between the effect portion and the support, where each T-shaped coupling portion is provided with respect to a corresponding side among four sides of the sensor chip, and couples the effect portion and the support. Each of the four coupling portions is a T-shaped beam having a bridge beam portion and an elastic portion (see, e.g., Patent Document 1).

CITATION LIST

[Patent Document]
Patent Document 1: Japanese Unexamined Patent Application Publication No. 2003-254843

SUMMARY

In recent years, there is demand for force sensor devices having greater rating capacity. However, a strain inducing body that constitutes such a force sensor device having the greater rating capacity is displaced greatly in comparison to a compact force sensor device. Thus, in a structure of a sensor chip used in the force sensor device, there are one or more beams that cannot greatly deform when the strain inducing body is displaced in a particular direction, and consequently the one or more beams may be broken.

In view of the point described above, an object of the present disclosure is to provide a sensor chip with increased fracture resistance of a beam when displacement in various directions occurs.

A sensor chip includes multiple sensing blocks each of which includes two or more T-patterned beam structures. Each T-patterned beam structure includes strain-detecting elements, at least one first detection beam, and a second detection beam extending from the first detection beam in a direction perpendicular to the first detection beam. Each T-patterned beam structure includes a connection portion formed by coupling ends of second detection beams in respective T-patterned structures, the connection portion including a force point portion. The sensor chip is configured to detect up to six axes relating to predetermined axial forces or moments around the predetermined axes, based on a change in an output of each of the strain-detecting elements, the output of each strain-detecting element changing in accordance with an input applied to a given force point portion.

According to the disclosed technique, a sensor chip that improves fracture resistance of a beam with respect to displacements in various directions can be provided.

BRIEF DESCRIPTION OF THE DRAWINGS

FIG. 18 is a diagram illustrating a simulation result when an input Fz is applied to the sensor chip;

FIG. 19 is a partial perspective view of the sensor chip illustrated in FIG. 18;

DESCRIPTION OF THE EMBODIMENTS

One or more embodiments will be described with reference to the drawings. In each figure, the same components are indicated by the same numerals, and description thereof may be omitted.

First Embodiment (Schematic Configuration of Force Sensor Device 1)

Figure 1:
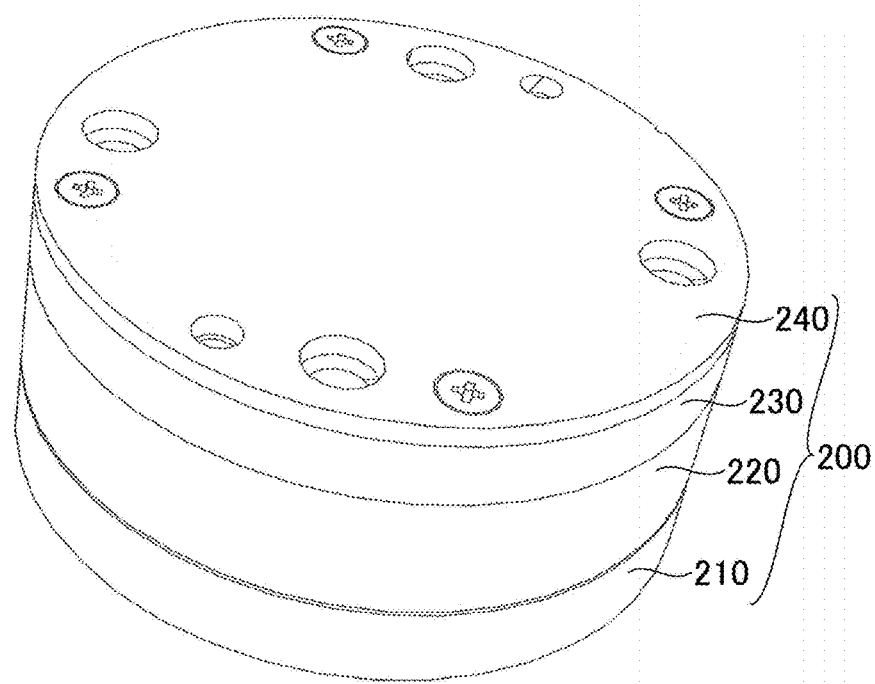
FIG. 1 is a perspective view of a force sensor device according to a first embodiment.
Figure 2:
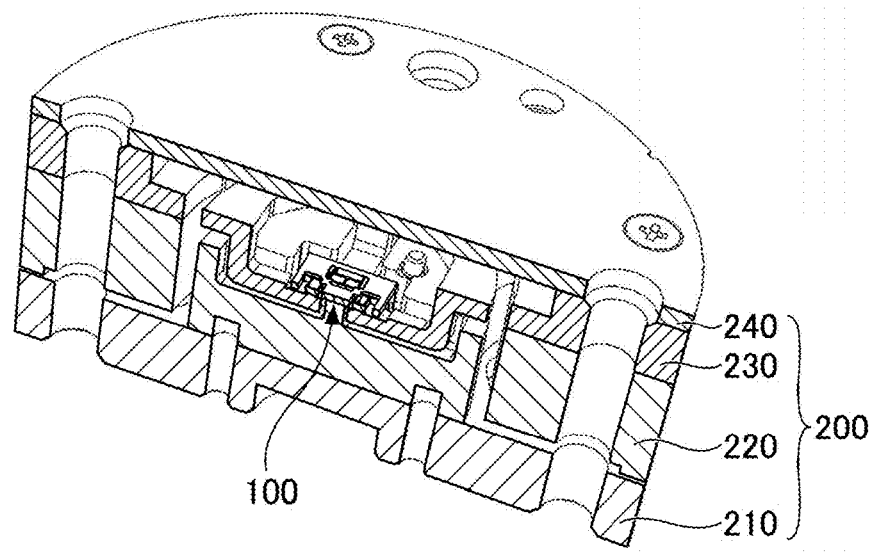
FIG. 2 is a cross-sectional perspective view of the force sensor device according to the first embodiment.

FIG. 1 is a perspective view of a force sensor device according to a first embodiment. FIG. 2 is a cross-sectional perspective view of the force sensor device according to the first embodiment. Referring to FIG. 1 and FIG. 2, the force sensor device 1 includes a sensor chip 100 and a strain inducing body 200. The force sensor device 1 is, for example, a multi-axis force sensor device provided in an arm, a finger, or the like of a robot that is used for a machine tool or the like.

The sensor chip 100 has a function of detecting up to six axes relating to displacements in predetermined axial directions. The strain inducing body 200 has a function of transmitting at least one among an applied force and a moment, to the sensor chip 100. In the following description of embodiments, for example, a case in which the sensor chip 100 detects six axes will be described, but there is no limitation to such a sensor chip. For example, the sensor chip 100 that detects three axes or the like can be adopted.

The strain inducing body 200 includes a force receiving plate 210, a strain inducing portion 220, an input transmitter 230, and a cover plate 240. The strain inducing portion 220 is layered on the force receiving plate 210, the input transmitter 230 is layered on the strain inducing portion 220, and the cover plate 240 is layered on the input transmitter 230. The strain inducing body 200 is substantially cylindrical as a whole. The function of the strain inducing body 200 is mainly implemented by the strain inducing portion 220 and the input transmitter 230, and thus the force receiving plate 210 and the cover plate 240 may be provided as needed.

In the present embodiment, for the sake of convenience, for the force sensor device 1, the side of the cover plate 240 is referred to as a top side or one side, and the side of the force receiving plate 210 is referred to as a bottom side or another side. Further, for each component, the surface on the side of the cover plate 240 is referred to as one surface or a top surface, and the surface on the side of the force receiving plate 210 is referred to as another surface or a bottom surface. The force sensor device 1 may be used in a state of being upside down, or can be disposed at any angle. A plan view means that an object is viewed in a direction (Z-axis direction) normal to the top surface of the cover plate 240, and a planar shape refers to a shape of the object when viewed in the direction (Z-axial direction) normal to the top surface of the cover plate 240.

Figure 3:
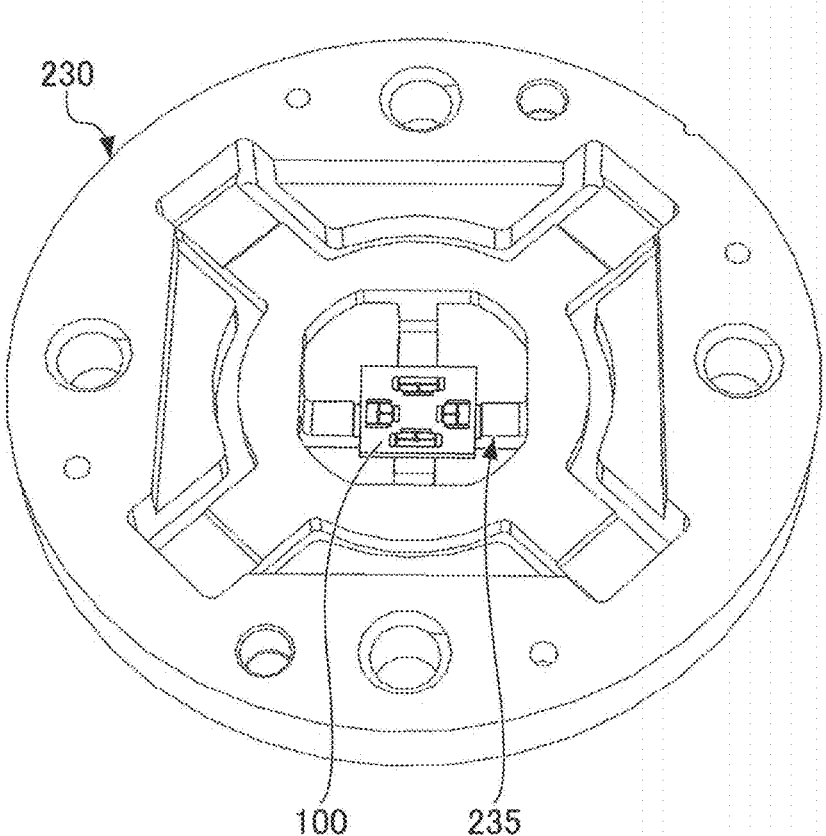
FIG. 3 is a perspective top view of a sensor chip attached to an input transmitter.
Figure 4:
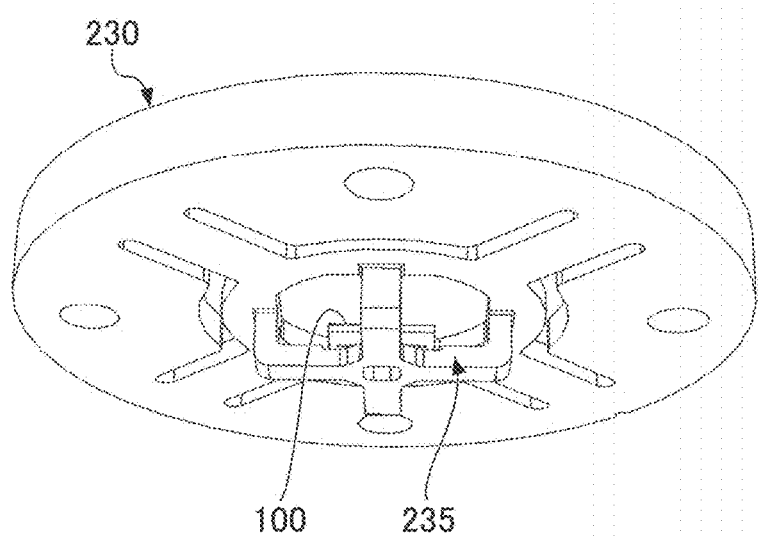
FIG. 4 is a perspective bottom view of the sensor chip attached to the input transmitter.

FIG. 3 is a perspective top view of the sensor chip attached to the input transmitter. FIG. 4 is a perspective bottom view of the sensor chip attached to the input transmitter. As illustrated in FIG. 3 and FIG. 4, an accommodating portion that protrudes from the bottom surface of the input transmitter 230, toward the strain inducing portion 220, is provided in the input transmitter 230. The sensor chip 100 is secured to the accommodating portion 235 toward the cover plate 240.

Specifically, as described below, four second connection portions 235c (see FIGS. 22 to 24 and the like below) each of which enters the cover plate 240 are disposed in the accommodating portion 235. The second connection portions 235c are respectively connected to the bottom surfaces of force point portions 151 to 154 (see FIGS. 5 to 8 and the like below) of the sensor chip 100.

The accommodating portion 235 enters the strain inducing portion 220. As described below, first connection portions 224 (see FIG. 21 below), which are five columnar portions and protrude toward the input transmitter 230, are disposed in the strain inducing portion 220. The first connection portions 224 are respectively connected to bottom surfaces of the supports 101 to 105 (see FIGS. 5 to 8 and the like below) in the sensor chip 100.

The sensor chip 100 and the strain inducing body 200 will be described below in detail. In the following description, the word "parallel" is intended to include a case in which an angle between two straight lines or sides is in the range of 0°±10°. The word "vertical" or "perpendicular" is intended to include a case in which an angle between two straight lines or between sides is in the range of 90°±10°. However, when a special specification is described, it is applied. The word "center" and "middle" are intended to include an approximate center and middle of an object, and are not intended to mean only an exact center and middle. In other words, variations in manufacturing error shall be tolerable. The same applies to point symmetry and line symmetry.

(Sensor Chip 100)

Figure 5:
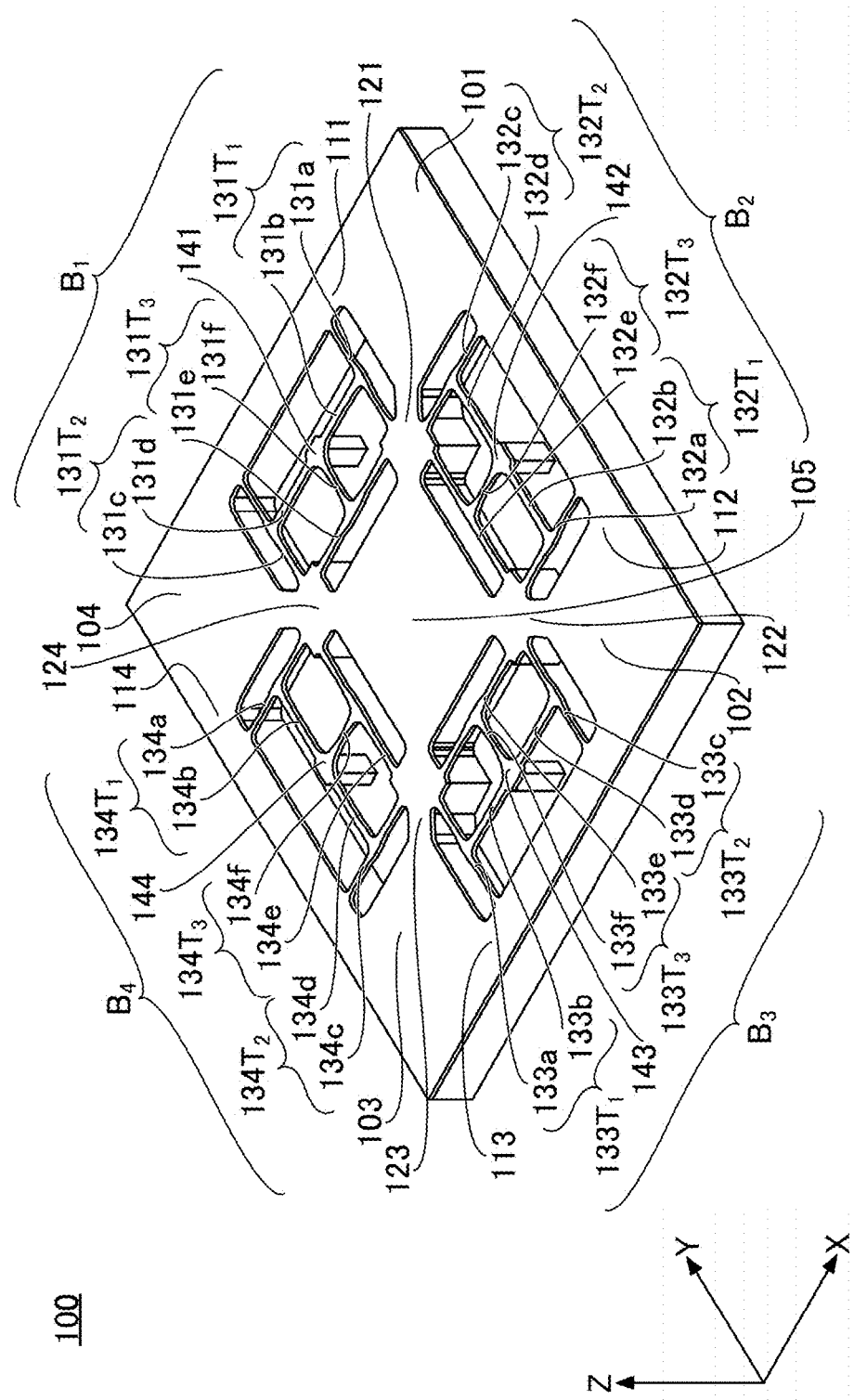
FIG. 5 is a perspective view of a sensor chip 100 when viewed in a positive Z-axis direction.
Figure 6:
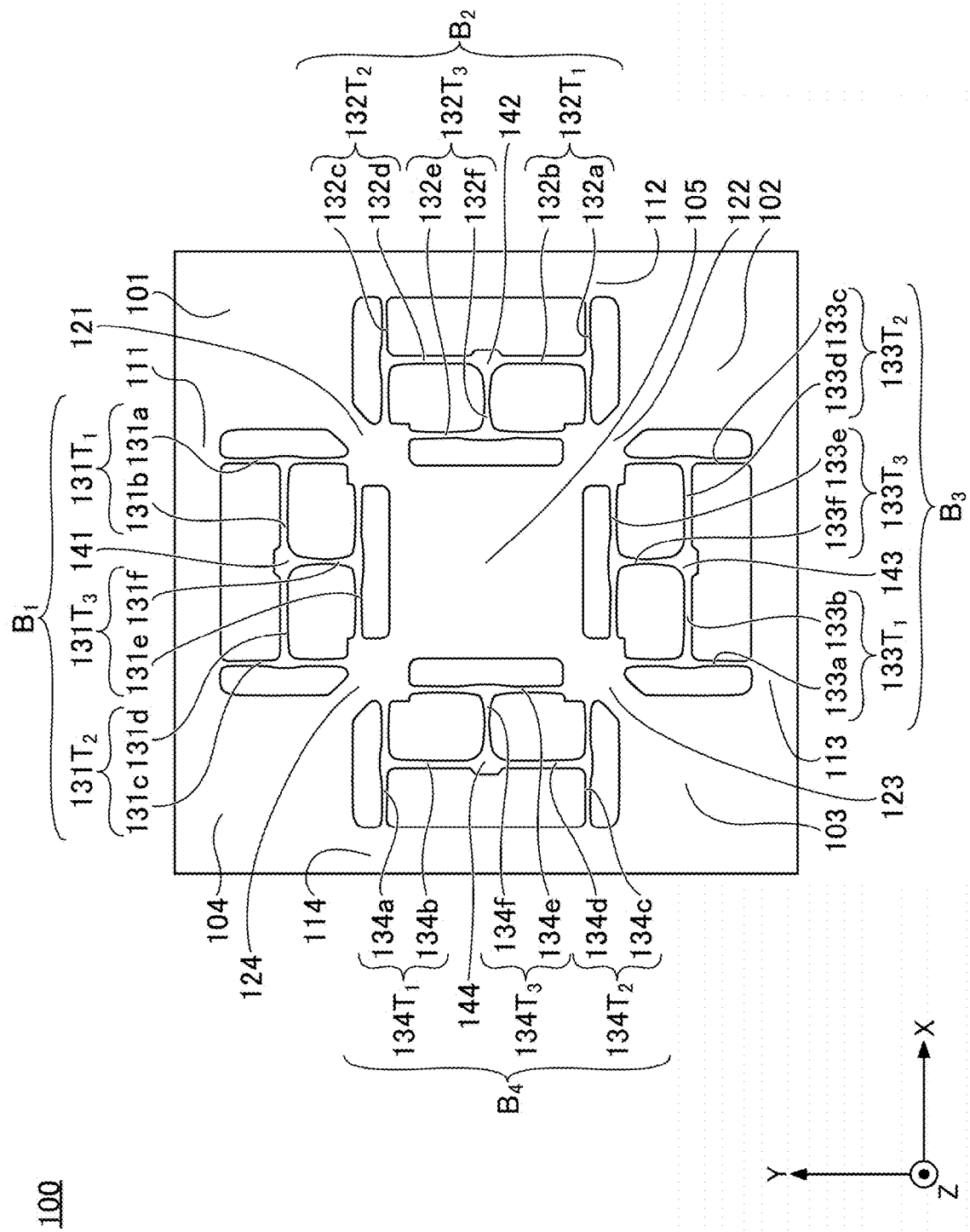
FIG. 6 is a plan view of the sensor chip 100 when viewed in the positive Z-axis direction.
Figure 7:
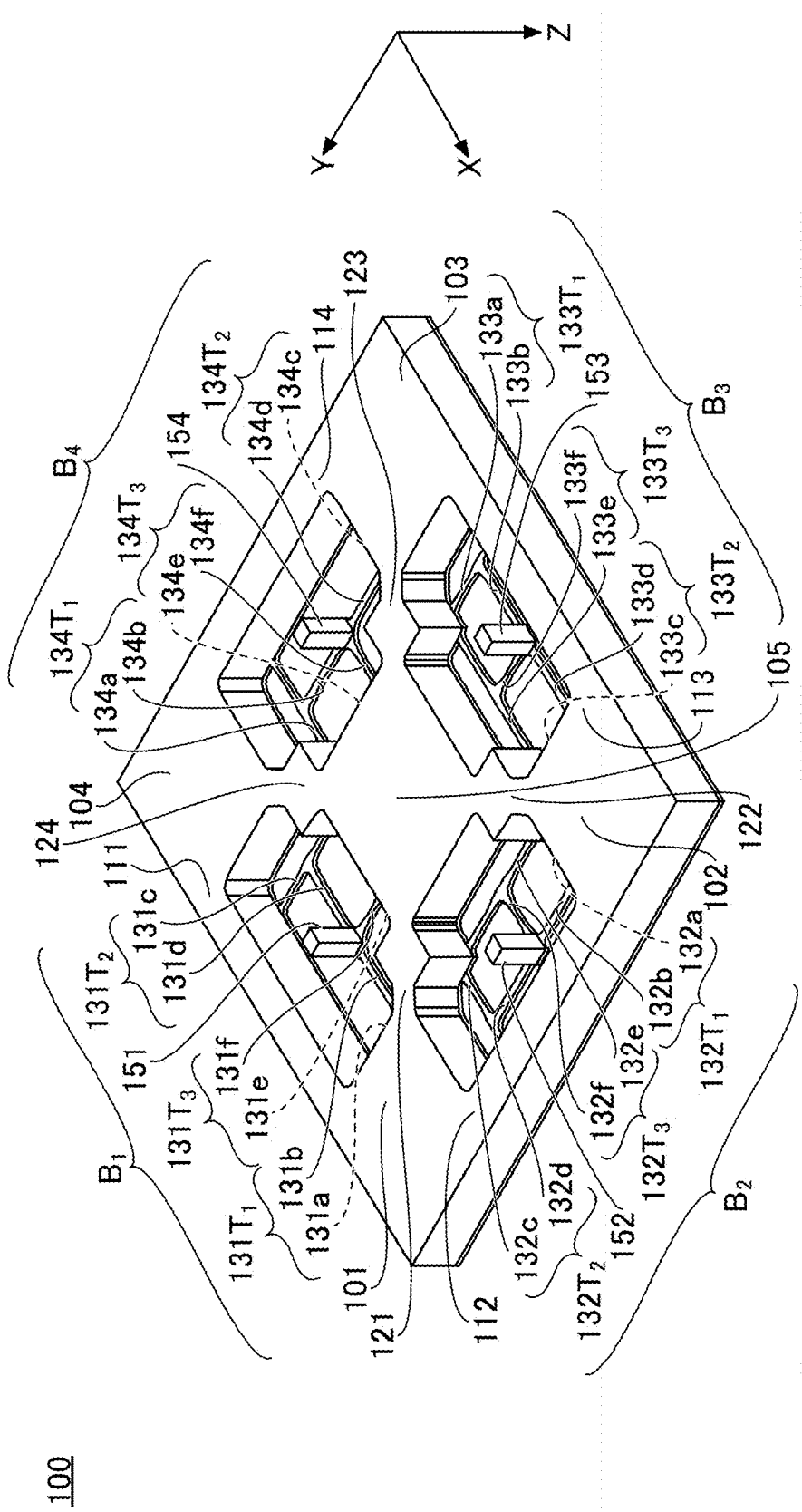
FIG. 7 is a perspective view of the sensor chip 100 when viewed in a negative Z-axis direction.
Figure 8:
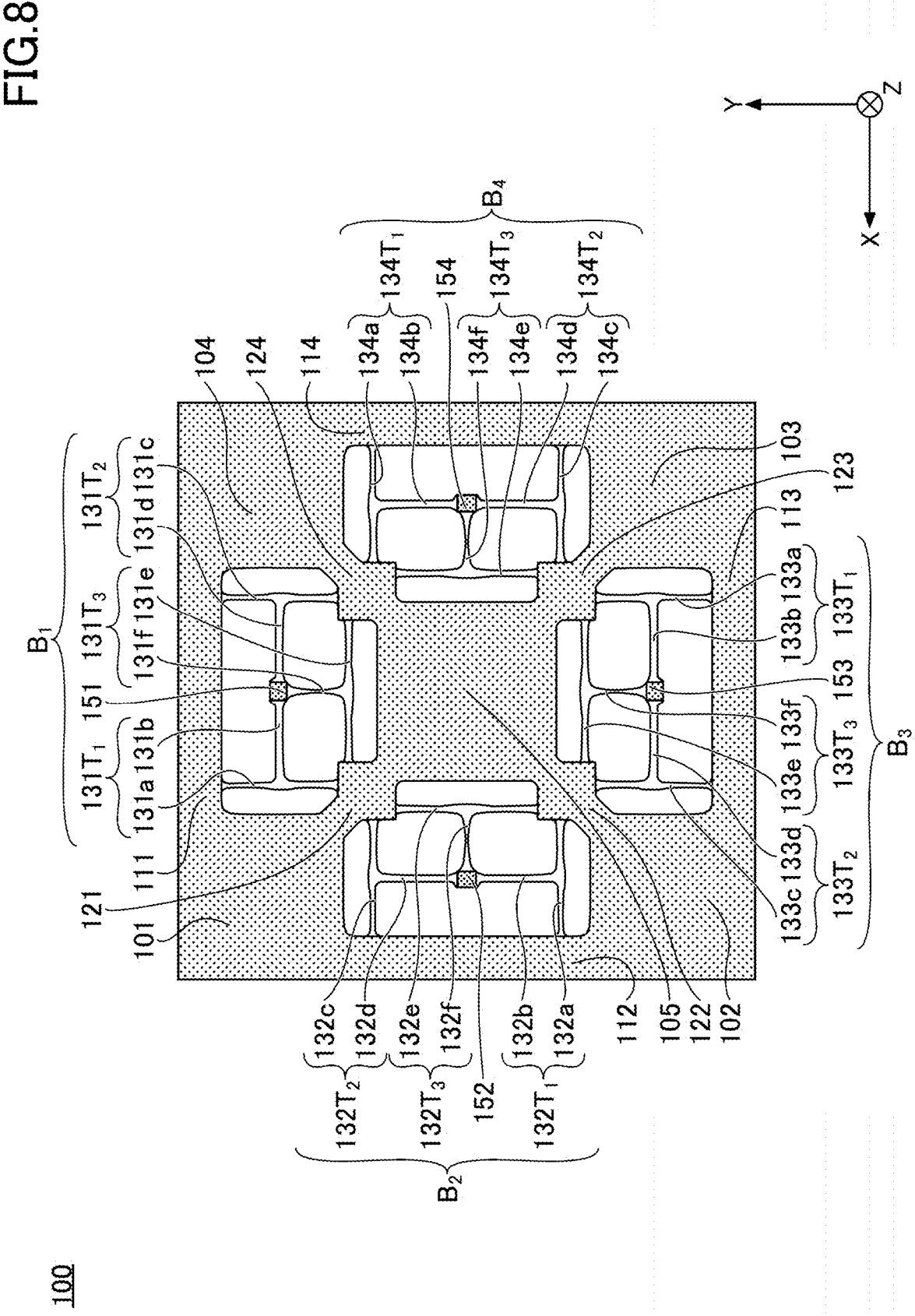
FIG. 8 is a bottom view of the sensor chip 100 when viewed in the negative Z-axis direction.

FIG. 5 is a perspective view of the sensor chip 100 when viewed in the positive Z-axis direction. FIG. 6 is a plan view of the sensor chip 100 when viewed in the positive Z-axis direction. FIG. 7 is a perspective view of the sensor chip 100 when viewed in the negative Z-axis direction. FIG. 8 is a bottom view of the sensor chip 100 when viewed in the negative Z-axis direction. In FIG. 8, for the sake of convenience, surfaces at the same height are illustrated in the same crepe pattern. In this description, a direction parallel to one side of the top surface of the sensor chip 100 refers to the X-axis direction, a direction perpendicular to the one side of the top surface of the sensor chip 100 refers to the Y-axis direction, and a thickness direction (direction normal to the top surface of the sensor chip 100) of the sensor chip 100 refers to the Z-axis direction. The X-axis direction, the Y-axis direction, and the Z-axis direction are mutually perpendicular.

The sensor chip 100 illustrated in FIGS. 5 to 8 is a microelectromechanical systems (MEMS) sensor chip that is one chip and can detect up to six axes. The sensor chip 100 is formed of a semiconductor substrate such as a silicon on insulator (SOI) substrate. The planar shape of the sensor chip 100 can be, for example, an approximate 7000 μm per side rectangle (square or rectangle).

The sensor chip 100 includes five columnar supports 101 to 105. The planar shape of each of the supports 101 to 105 can be, for example, an approximate 2000 μm per side square. The supports 101 to 104 are respectively disposed at four corners of the rectangular sensor chip 100. The support 105 is disposed on a central portion of the rectangular sensor chip 100. Each of the supports 101 to 104 is a representative example of a first support, and the support 105 is a representative example of a second support.

A frame 112 (for coupling supports that are next to each other), of which both ends are fixed by the support 101 and the support 102, is provided between the support 101 and the support 102. A frame 113 (for coupling supports that are next to each other), of which both ends are fixed by the support 102 and the support 103, is provided between the support 102 and the support 103.

A frame 114 (for coupling supports that are next to each other), of which both ends are fixed by the support 103 and the support 104, is provided between the support 103 and the support 104. A frame 111 (for coupling supports that are next to each other), of which both ends are fixed by the support 104 and the support 101, is provided between the support 104 and the support 101.

In other words, four frames 111, 112, 113, and 114 are formed as a structural frame of the sensor chip 100, and the supports 101, 102, 103, and 104 are each disposed at a corner at which given frames are coupled to each other.

An internal corner of the support 101 and a corner of the support 105 facing the internal corner of the support 101 are coupled by a coupling portion 121. An internal corner of the support 102 and a corner of the support 105 facing the internal corner of the support 102 are coupled by a coupling portion 122.

An internal corner of the support 103 and a corner of the support 105 facing the internal corner of the support 103 are coupled by a coupling portion 123. An internal corner of the support 104 and a corner of the support 105 facing the internal corner of the support 104 are coupled by a coupling portion 124.

In such a manner, the sensor chip 100 includes the coupling portions 121 to 124 each of which couples the support 105 and a given support among the supports 101 to 104. The coupling portions 121 to 124 are each disposed diagonally relative to the X-axis direction (Y-axis direction). The coupling portions 121 to 124 are respectively disposed so as not to be parallel to the frames 111, 112, 113, and 114.

The supports 101 to 105, the frames 111 to 114, and the coupling portions 121 to 124 can be each formed of, for example, an active layer, a BOX layer, and a support layer of the SOI substrate. The thickness of each of those layers can be, for example, in the range of about 400 μm to about 600 μm.

The sensor chip 100 has four sensing blocks $B_1$ to $B_4$. Each sensing block includes three T-patterned beam structures in each of which piezoresistive elements being strain-detecting elements are disposed. The T-patterned beam structure refers to a structure that includes a first detection beam and a second detection beam that extends from a middle portion of the first detection beam in a direction perpendicular to the first detection beam.

Specifically, the sensing block $B_1$ includes T-patterned beam structures $131T_1$, $131T_2$, and $131T_3$. The sensing block $B_2$ includes T-patterned beam structures $132T_1$, $132T_2$, and $132T_3$. The sensing block $B_3$ includes T-patterned beam structures $133T_1$, $133T_2$, and $133T_3$. The sensing block $B_4$ includes T-patterned beam structures $134T_1$, $134T_2$, and $134T_3$. The beam structure will be described below in more details.

In the sensing block $B_1$, in a plan view, a first detection beam 131a is provided parallel to a side of the support 104 toward the support 101 so as to be at a predetermined distance from the side of the support 104. The first detection beam 131a extends between the frame 111, toward the support 101, and the coupling portion 121, toward the support 105. A second detection beam 131b is provided such that one end of the second detection beam is coupled at a middle portion of the first detection beam 131a in a longitudinal direction of the first detection beam. The second detection beam 131b extends toward the support 104 in a direction perpendicular to the longitudinal direction of the first detection beam 131a. The first detection beam 131a and the second detection beam 131b constitute the T-patterned beam structure $131T_1$.

In a plan view, a first detection beam 131c is provided parallel to a side of the support 104 toward the support 101 so as to be at a predetermined distance from the side of the support 104. The first detection beam 131c extends between the coupling portion 111, toward the support 104, and the coupling portion 124, toward the support 105. A second detection beam 131d is provided such that one end of the second detection beam is coupled at a middle portion of the first detection beam 131c in a longitudinal direction of the first detection beam. The second detection beam 131d extends toward the support 101 in a direction perpendicular to the longitudinal direction of the first detection beam 131c. The first detection beam 131c and the second detection beam 131d constitute the T-patterned beam structure $131T_2$.

In a plan view, a first detection beam 131e is provided parallel to a side of the support 105 toward the frame 111 so as to be at a predetermined distance from the side of the support 105. The first detection beam 131e extends between the coupling portion 121, toward the support 105, and the coupling portion 124, toward the support 105. A second detection beam 131f is provided such that one end of the second detection beam is coupled at a middle portion of the first detection beam 131e in a longitudinal direction, and the second detection beam 131f extends toward the frame 111 in a direction perpendicular to the longitudinal direction of the first detection beam 131e. The first detection beam 131e and the second detection beam 131f constitute the T-patterned beam structure $131T_3$.

Another end of the second detection beam 131b, another end of the second detection beam 131d, and another end of the second detection beam 131f are connected to one another to thereby form a connection portion 141. A force point portion 151 is provided at the bottom surface of the connection portion 141. The force point portion 151 has, for example, a rectangular prismatic shape. The T-patterned beam structures $131T_1$, $131T_2$, and $131T_3$, the connection portion 141, and the force point portion 151 constitute the sensing block $B_1$.

In the sensing block $B_1$, the first detection beam 131a, the first detection beam 131c, and the second detection beam 131f are parallel to one another. Also, the second detection beams 131b and 131d, and the first detection beam 131e are parallel to one another. The thickness of each detection beam in the sensing block $B_1$ can be, for example, in the range of about 30 μm to about 50 μm.

In the sensing block $B_2$, in a plan view, a first detection beam 132a is provided parallel to a side of the support 102 toward the support 101 so as to be at a predetermined distance from the side of the support 102. The first detection beam 132a extends between the frame 112, toward the support 102, and the coupling portion 122, toward the support 105. A second detection beam 132b is provided such that one end of the second detection beam is coupled at a middle portion of the first detection beam 132a in a longitudinal direction of the first detection beam. The second detection beam 132b extends toward the support 101 in a direction perpendicular to the longitudinal direction of the first detection beam 132a. The first detection beam 132a and the second detection beam 132b constitute the T-patterned beam structure $131T_2$.

In a plan view, a first detection beam 132c is provided parallel to a side of the support 101 toward the support 102 so as to be at a predetermined distance from the side of the support 101. The first detection beam 132c extends between the frame 112, toward the support 101, and the coupling portion 121, toward the support 105. A second detection beam 132d is provided such that one end of the second detection beam is coupled at a middle portion of the first detection beam 132c in a longitudinal direction of the first detection beam. The second detection beam 132d extends toward the support 102 in a direction perpendicular to the longitudinal direction of the first detection beam 132c. The first detection beam 132c and the second detection beam 132d constitute the T-patterned beam structure $132T_2$.

In a plan view, a first detection beam 132e is provided parallel to a side of the support 105 toward the frame 112 so as to be at a predetermined distance from the side of the support 105. The first detection beam 132e extends between the coupling portion 122, toward the support 105, and the coupling portion 121, toward the support 105. A second detection beam 132f is provided such that one end of the second detection beam is coupled at a middle portion of the first detection beam 132e in a longitudinal direction, and the second detection beam 132f extends toward the frame 111 so as to be perpendicular to the longitudinal direction of the first detection beam 132e. The first detection beam 132e and the second detection beam 132f constitute the T-patterned beam structure $132T_3$.

Another end of the second detection beam 132b, another end of the second detection beam 132d, and another end of the second detection beam 132f are connected to one another to thereby form a connection portion 142. A force point portion 152 is provided at the bottom surface of the connection portion 142. The force point portion 152 has, for example, a rectangular prismatic shape. The T-patterned beam structures $132T_1$, $132T_2$, and $132T_3$, the connection portion 142, and the force point portion 152 constitute the sensing block $B_2$.

In the sensing block $B_2$, the first detection beam 132a, the first detection beam 132c, and the second detection beam 132f are parallel to one another. Also, the second detection beams 132b and 132d, and the first detection beam 132e are parallel to one another. The thickness of each detection beam in the sensing block $B_2$ may be, for example, in the range of about 30 μm to about 50 μm.

In the sensing block $B_3$, in a plan view, a first detection beam 133a is provided parallel to a side of the support 103 toward the support 102 so as to be at a predetermined distance from the side of the support 103. The first detection beam 133a extends between the frame 113, toward the support 103, and the coupling portion 123, toward the support 105. A second detection beam 133b is provided such that one end of the second detection beam is coupled at a middle portion of the first detection beam 133a in a longitudinal direction of the first detection beam. The second detection beam 133b extends toward the support 102 in a direction perpendicular to the longitudinal direction of the first detection beam 133a. The first detection beam 133a and the second detection beam 133b constitute the T-patterned beam structure $133T_1$.

In a plan view, a first detection beam 133c is provided parallel to a side of the support 102 toward the support 103 so as to be at a predetermined distance from the side of the support 102. The first detection beam 133c extends between the frame 113, toward the support 102, and the coupling portion 122, toward the support 105. A second detection beam 133d is provided such that one end of the second detection beam is coupled at a middle portion of the first detection beam 133c in a longitudinal direction of the first detection beam. The second detection beam 131d extends toward the support 103 in a direction perpendicular to the longitudinal direction of the first detection beam 133c. The first detection beam 133c and the second detection beam 133d constitute the T-patterned beam structure $133T_2$.

In a plan view, a first detection beam 131e is provided parallel to a side of the support 105 toward the frame 111 so as to be at a predetermined distance from the side of the support 105. The first detection beam 131e extends between the coupling portion 121, toward the support 105, and the coupling portion 124, toward the support 105. A second detection beam 131f is provided such that one end of the second detection beam is coupled at a middle portion of the first detection beam 131e in a longitudinal direction, and the second detection beam 131f extends toward the frame 111 so as to be perpendicular to the longitudinal direction of the first detection beam 131e. The first detection beam 131e and the second detection beam 131f constitute the T-patterned beam structure $131T_3$.

Another end of the second detection beam 133b, another end of the second detection beam 133d, and another end of the second detection beam 133f are connected to one another to thereby form a connection portion 143. A force point portion 153 is provided at the bottom surface of the connection portion 143. The force point portion 153 has, for example, a rectangular prismatic shape. The T-patterned beam structures $133T_1$, $133T_2$, and $133T_3$, the connection portion 143, and the force point portion 153 constitute the sensing block $B_3$.

In the sensing block $B_3$, the first detection beam 133a, the first detection beam 133c, and the second detection beam 133f are parallel to one another. Also, the second detection beams 133b and 133d, and the first detection beam 133e are parallel to one another. The thickness of each detection beam in the sensing block $B_3$ may be, for example, in the range of about 30 μm to about 50 μm.

In the sensing block $B_4$, in a plan view, a first detection beam 134a is provided parallel to a side of the support 104 toward the support 103 so as to be at a predetermined distance from the side of the support 104. The first detection beam 134a extends between the frame 114, toward the support 104, and the coupling portion 124, toward the support 105. A second detection beam 134b is provided such that one end of the second detection beam is coupled at a middle portion of the first detection beam 134a in a longitudinal direction of the first detection beam. The second detection beam 134b extends toward the support 103 in a direction perpendicular to the longitudinal direction of the first detection beam 134a. The first detection beam 134a and the second detection beam 134b constitute the T-patterned beam structure 134T$_1$.

In a plan view, a first detection beam 134c is provided parallel to a side of the support 103 toward the support 104 so as to be at a predetermined distance from the side of the support 103. The first detection beam 134c extends between the frame 114, toward the support 103, and the coupling portion 123, toward the support 105. A second detection beam 134d is provided such that one end of the second detection beam is coupled at a middle portion of the first detection beam 134c in a longitudinal direction of the first detection beam. The second detection beam 131d extends toward the support 104 in a direction perpendicular to the longitudinal direction of the first detection beam 134c. The first detection beam 134c and the second detection beam 134d constitute the T-patterned beam structure 134T$_2$.

In a plan view, a first detection beam 134e is provided parallel to a side of the support 105 toward the frame 114 so as to be at a predetermined distance from the side of the support 105. The first detection beam 134e extends between the coupling portion 124, toward the support 105, and the coupling portion 123, toward the support 105. A second detection beam 134f is provided such that one end of the second detection beam is coupled at a middle portion of the first detection beam 134e in a longitudinal direction, and the second detection beam 131f extends toward the frame 114 so as to be perpendicular to the longitudinal direction of the first detection beam 134e. The first detection beam 134e and the second detection beam 134f constitute the T-patterned beam structure 134T$_3$.

Another end of the second detection beam 134b, another end of the second detection beam 134d, and another end of the second detection beam 134f are connected to one another to thereby form a connection portion 144. A force point portion 154 is provided at the bottom surface of the connection portion 144. The force point portion 154 has, for example, a rectangular prismatic shape. The T-patterned beam structures 134T$_1$, 134T$_2$, and 134T$_3$, the connection portion 144, and the force point portion 154 constitute the sensing block B$_4$.

In the sensing block B$_4$, the first detection beam 134a, the first detection beam 134c, and the second detection beam 134f are parallel to one another. Also, the second detection beams 134b and 134d, and the first detection beam 134e are parallel to one another. The thickness of each detection beam in the sensing block B$_4$ may be, for example, in the range of about 30 μm to about 50 μm.

Thus, the sensor chip 100 includes the four sensing blocks (sensing blocks B$_1$ to B$_4$). Each sensing block is disposed in a region surrounded by (i) given supports that are next to each other and are among the supports 101 to 104, (ii) a given frame and a given coupling portion each of which couples the given supports that are next to each other, and (iii) the support 105. In a plan view, for example, given sensing blocks can be disposed to be point-symmetric with respect to the center of the sensor chip.

Each sensing block includes three T-patterned beam structures. In each sensing block, three T-patterned beam structures include two T-patterned beam structures in which, in a plan view, a given connection portion is interposed between first detection beams that are respectively included in two T-patterned beam structures and are disposed parallel to each other. The three T-beam structures also include one T-patterned beam structure including a first detection beam that is disposed parallel to second detection beams included in the respective two T-patterned beam structures. The first detection beam in the one T-patterned beam structure is disposed between the given connection portion and the support 105.

For example, in the sensing block B$_1$, three T-patterned beam structures include T-patterned beam structures 131T$_1$ and 131T$_2$ in which, in a plan view, the connection portion 141 is interposed between the first detection beam 131a and the first detection beam 131c that are disposed parallel to each other. The three T-patterned beam structures also include the T-patterned beam structure 131T$_3$ including the first detection beam 131e that is disposed parallel to the second detection beams 131b and 131d included in the respective T-patterned beam structures 131T$_1$ and 131T$_2$. The first detection beam 131e in the T-patterned beam structure 131T$_3$ is disposed between the connection portion 141 and the support 105. The structure in each of the sensing blocks B$_2$ to B$_4$ is similar to that in the sensing block B$_1$.

Each of the force point portions 151 to 154 is a point to which an external force is applied. Each force point portion can be formed of, for example, a BOX layer and a support layer in the SOI substrate. The bottom surface of each of the force point portions 151 to 154 substantially corresponds to the bottom surface of a corresponding support among the supports 101 to 105.

In such a manner, when a force or displacement is obtained through each of the four force point portions 151 to 154, a given beam deforms so as to differ according to a force type, thereby providing a sensor with greater isolation of 6 axes. The number of force point portions is the same as the number of positions of the strain inducing body to which displacements are input.

One or more internal corners of the sensor chip 100 are preferably R-shaped in order to suppress stress concentration.

The supports 101 to 105 in the sensor chip 100 are connected to a non-movable portion in the strain inducing body 200, and the force point portions 151 to 154 are connected to a movable portion of the strain inducing body 200. Even if the movable portion and non-movable portion are reversed with respect to each other, the sensor chip 100 functions as a force sensor device. That is, the supports 101 to 105 in the sensor chip 100 are connected to the movable portion of the strain inducing body 200, and the force point portions 151 to 154 may be connected to the non-movable portion of the strain inducing body 200.

Figure 9:
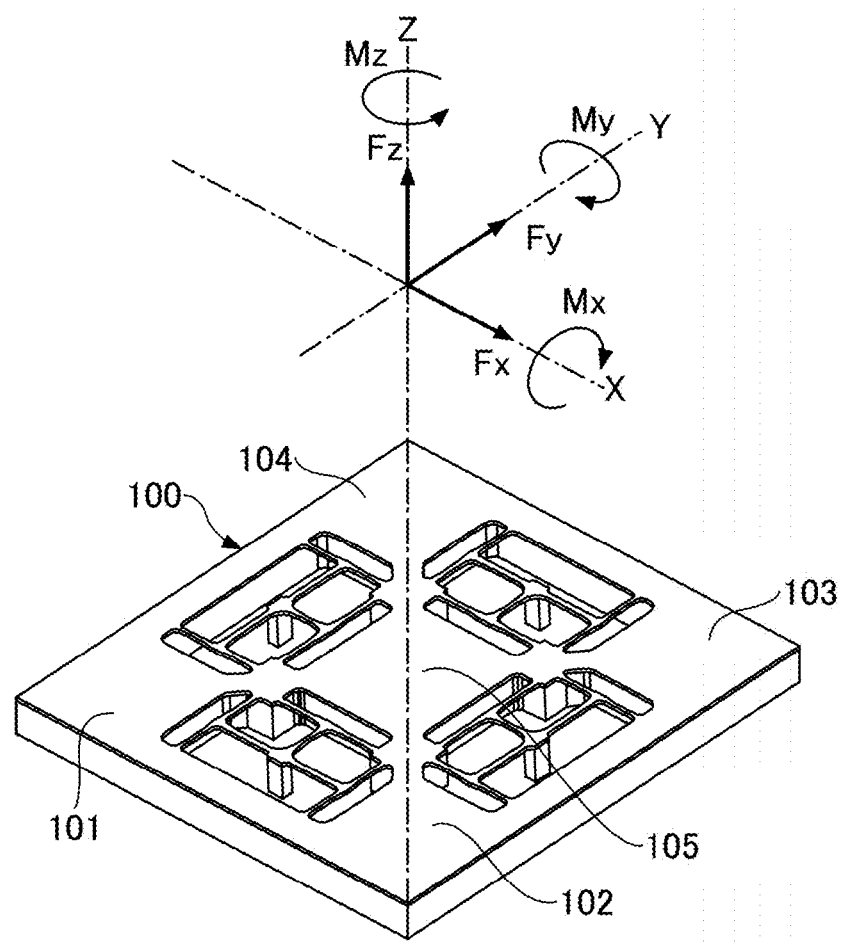
FIG. 9 is a diagram for describing signs for forces and moments applied to axes.

FIG. 9 is a diagram for describing signs for forces and moments applied to axes. As illustrated in FIG. 9, the force in the X-axis direction is expressed by Fx, the force in the Y-axis direction is expressed by Fy, and the force in the Z-axis direction is expressed by Fz. Also, the moment to cause rotation about the X-axis as an axis is expressed by Mx, the moment to cause rotation about the Y-axis as an axis is expressed by My, and the moment to cause rotation about the Z-axis as an axis is expressed by Mz.

Figure 10:
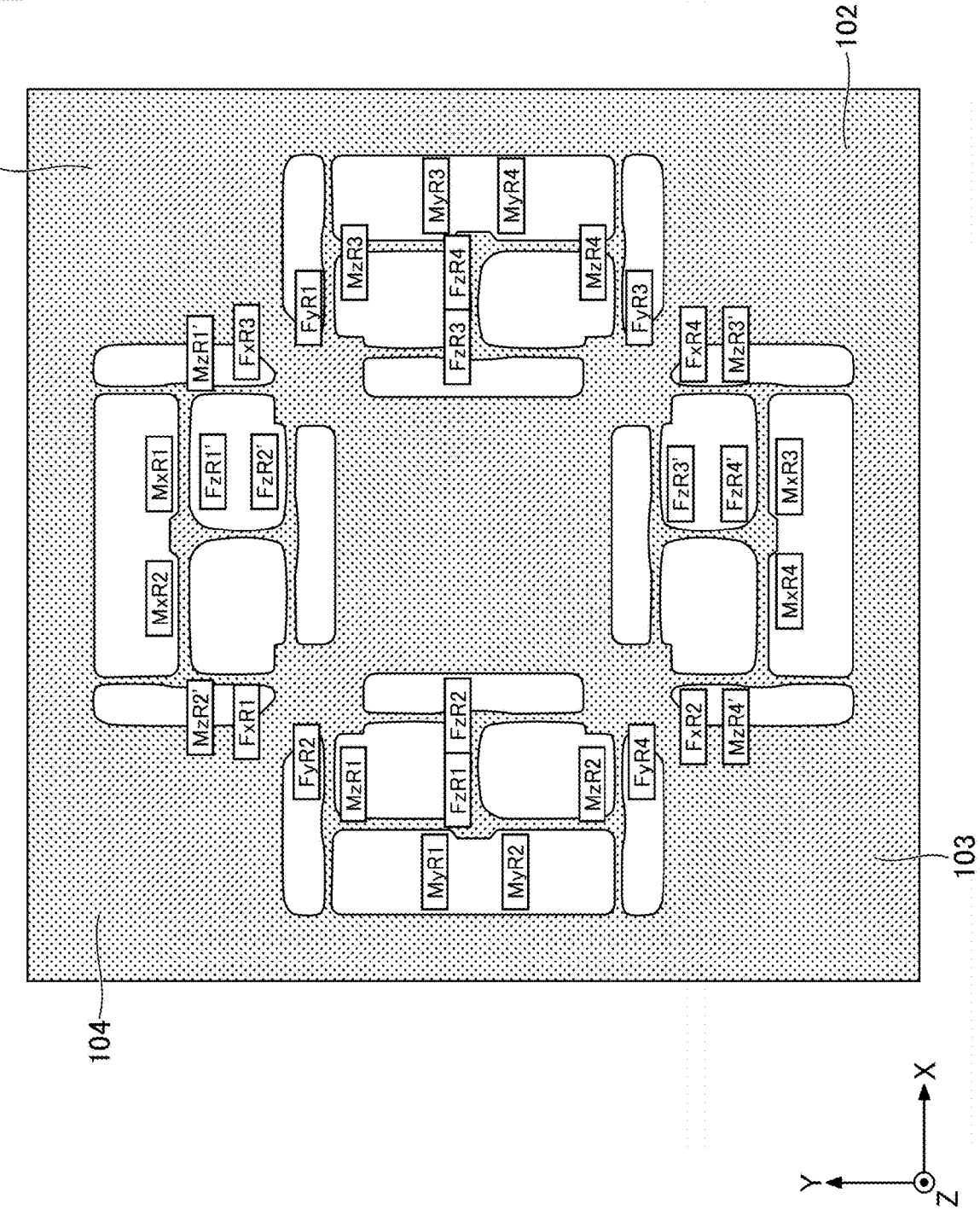
FIG. 10 is a diagram illustrating an example of the arrangement of piezoresistive elements of the sensor chip 100.
Figure 11:
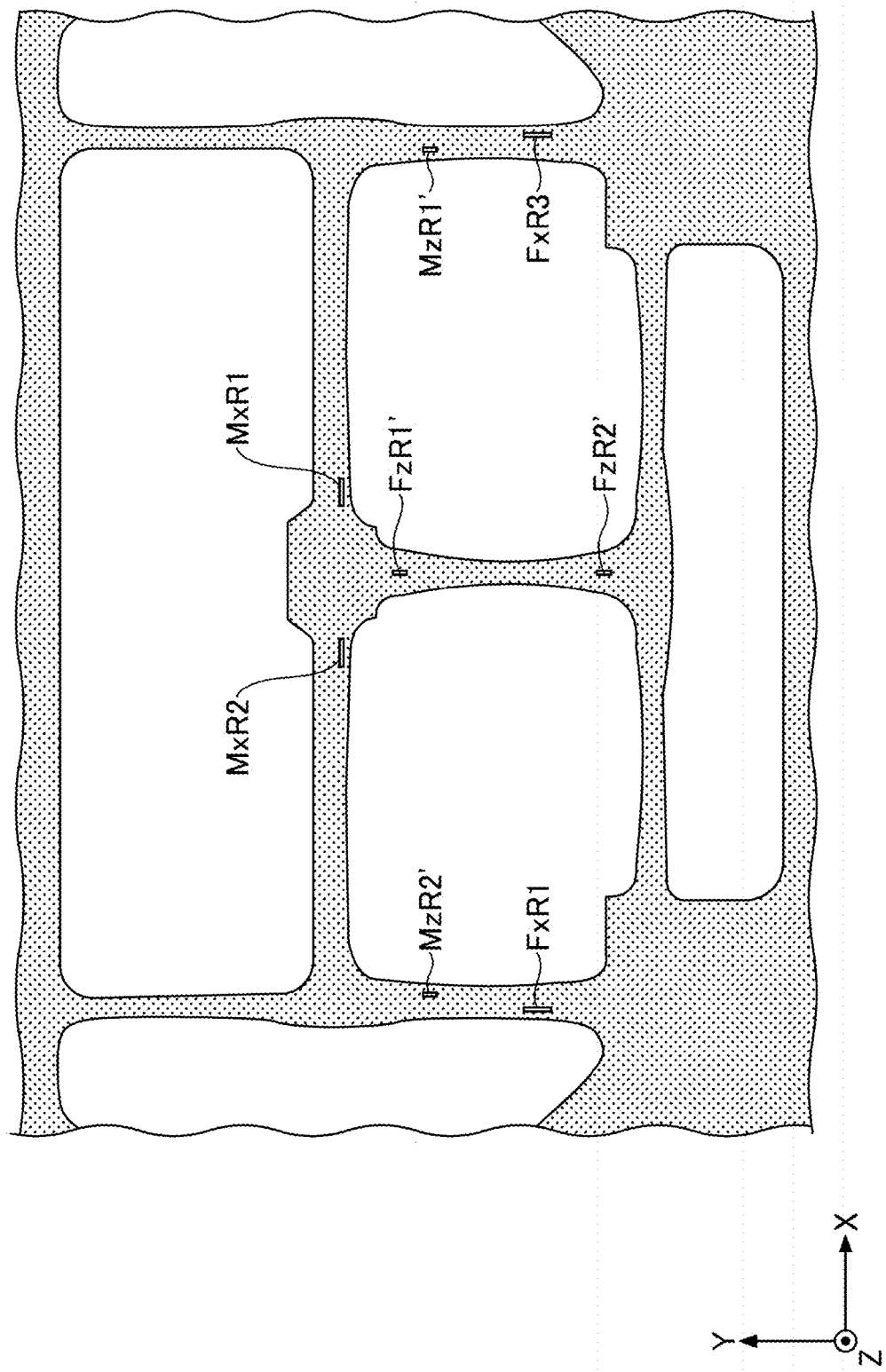
FIG. 11 is a partial enlarged view of the sensor chip in one sensing block illustrated in FIG. 10.

FIG. 10 is a diagram illustrating the arrangement of piezoresistive elements in the sensor chip 100. FIG. 11 is an enlarged partial view of one sensing block in the sensor chip illustrated in FIG. 10. As illustrated in FIG. 10 and FIG. 11, piezoresistive elements are each disposed at a predetermined location of a given sensing block corresponding to a force point portion among the four force point portions 151 to 154. The arrangement of the piezoresistive elements in each of the other sensing blocks illustrated in FIG. 10 is the same as that of the piezoresistive elements in the sensing block illustrated in FIG. 11.

Referring to FIGS. 5 to 8, FIG. 10, and FIG. 11, in the sensing block $B_1$ that includes the connection portion 141 and the force point portion 151, a piezoresistive element MzR1' is disposed at a portion of the first detection beam 131a that is toward the second detection beam 131b and is between the second detection beam 131b and the first detection beam 131e. A piezoresistive element FxR3 is disposed at a portion of the first detection beam 131a that is toward the first detection beam 131e and is between the second detection beam 131b and the first detection beam 131e. A piezoresistive element MxR1 is disposed on the second detection beam 131b toward the connection portion 141.

A piezoresistive element MzR2' is disposed at a portion of the first detection beam 131c that is toward the second detection beam 131d and is between the second detection beam 131d and the first detection beam 131e. A piezoresistive element FxR1 is disposed at a portion of the first detection beam 131c that is toward the first detection beam 131e and is between the second detection beam 131d and the first detection beam 131e. A piezoresistive element MxR2 is disposed on the second detection beam 131d toward the connection portion 141.

A piezoresistive element FzR1' is disposed on the second detection beam 131f toward the connection portion 141. A piezoresistive element FzR2' is disposed on the second detection beam 131f toward the first detection beam 131e. The piezoresistive elements MzR1', FxR3, MxR1, MzR2', FxR1, and MxR2 are each disposed at a location apart from a middle portion of a corresponding detection beam in a longitudinal direction.

In the sensing block $B_2$ that includes the connection portion 142 and the force point portion 152, a piezoresistive element MzR4 is disposed at a portion of the first detection beam 132a that is toward the second detection beam 132b and is between the second detection beam 132b and the first detection beam 132e. A piezoresistive element FyR3 is disposed at a portion of the first detection beam 132a that is toward the first detection beam 132e and is between the second detection beam 132b and the first detection beam 132e. A piezoresistive element MyR4 is disposed on the second detection beam 132b toward the connection portion 142.

A piezoresistive element MzR3 is disposed at a portion of the first detection beam 132c that is toward the second detection beam 132d and is between the second detection beam 132d and the first detection beam 132e. A piezoresistive element FyR1 is disposed at a portion of the first detection beam 132c that is toward the first detection beam 132e and is between the second detection beam 132d and the first detection beam 132e. A piezoresistive element MyR3 is disposed on the second detection beam 132d toward the connection portion 142.

A piezoresistive element FzR4 is disposed on the second detection beam 132f toward the connection portion 142. A piezoresistive element FzR3 is disposed on the second detection beam 132f toward the first detection beam 132e. The piezoresistive elements MzR4, FxR3, MyR4, MzR3, FyR1, and MyR3 are each disposed at a location apart from a middle portion of a corresponding detection beam in a longitudinal direction.

In the sensing block $B_3$ that includes the connection portion 143 and the force point portion 153, a piezoresistive element MzR4' is disposed at a portion of the first detection beam 133a that is toward the second detection beam 133b and is between the second detection beam 133b and the first detection beam 133e. A piezoresistive element FxR2 is disposed at a portion of the first detection beam 133a that is toward the first detection beam 133e and is between the second detection beam 133b and the first detection beam 133e. A piezoresistive element MxR4 is disposed on the second detection beam 133b toward the connection portion 143.

A piezoresistive element MzR3' is disposed at a portion of the first detection beam 133c that is toward the second detection beam 133d and is between the second detection beam 133d and the first detection beam 133e. A piezoresistive element FxR4 is disposed at a portion of the first detection beam 133c that is toward the first detection beam 133e and is between the second detection beam 133d and the first detection beam 133e. A piezoresistive element MxR3 is disposed on the second detection beam 133d toward the connection portion 143.

A piezoresistive element FzR4' is disposed on the second detection beam 133f toward the connection portion 143. A piezoresistive element FzR3' is disposed on the second detection beam 133f toward the first detection beam 133e. The piezoresistive elements MzR4', FxR2, MxR4, MzR3', FxR4, and MxR3 are each disposed at a location apart from a middle portion of a corresponding detection beam in a longitudinal direction.

In the sensing block $B_4$ that includes the connection portion 144 and the force point portion 154, a piezoresistive element MzR1 is disposed at a portion of the first detection beam 134a that is toward the second detection beam 134b and is between the second detection beam 134b and the first detection beam 134e. A piezoresistive element FyR2 is disposed at a portion of the first detection beam 134a that is toward the first detection beam 134e and is between the second detection beam 134b and the first detection beam 134e. A piezoresistive element MyR1 is disposed on the second detection beam 132b toward the connection portion 144.

A piezoresistive element MzR2 is disposed at a portion of the first detection beam 134c that is toward the second detection beam 134d and is between the second detection beam 134d and the first detection beam 134e. A piezoresistive element FyR4 is disposed at a portion of the first detection beam 134c that is toward the first detection beam 134e and is between the second detection beam 134d and the first detection beam 134e. A piezoresistive element MyR2 is disposed on the second detection beam 134d toward the connection portion 144.

A piezoresistive element FzR1 is disposed on the second detection beam 134f toward the connection portion 144. A piezoresistive element FzR2 is disposed on the second detection beam 134f toward the first detection beam 134e. The piezoresistive elements MzR1, FxR2, MyR3, MyR1, FzR2, and MyR2 are each disposed at a location apart from a middle portion of a corresponding detection beam in a longitudinal direction.

In such a manner, in the sensor chip 100, each of the sensing blocks individually includes multiple piezoresistive elements. With this arrangement, when inputs are respectively applied to the force point portions 151 to 154, the sensor chip 100 can detect up to six axes relating to forces in predetermined axis-directions or moments about respective predetermined axes, based on changes in the outputs of multiple piezoresistive elements on given beams.

In addition to the piezoresistive elements used to detect strain, one or more dummy piezoresistive elements may be disposed in the sensor chip 100. The dummy piezoresistive elements are used to adjust variations in stress against detection beams or resistance of a bridge circuit. For example, all piezoresistive elements including piezoresistive elements used to detect strain are arranged so as to be point-symmetrical with respect to the center of the support 105.

In the sensor chip 100, each piezoresistive element among multiple piezoresistive elements to detect the displacement in the X-axis direction and the displacement in the Y-axis direction is disposed on the first detection beam included in a given T-patterned beam structure, and further, each piezoresistive element among multiple piezoresistive elements to detect the displacement in the Z-axis direction is disposed on the second detection beam included in a given T-patterned beam structure. Furthermore, each piezoresistive element among multiple piezoresistive elements to detect moments about the Z-axis direction is disposed on the first detection beam included in a given T-patterned beam structure, and further, each piezoresistive element among multiple piezoresistive elements to detect moments about the X-axis direction and the Y-axis direction is disposed on the second detection beam included in a given T-patterned beam structure.

Each of the piezoresistive elements FxR1 to FxR4 detects the force Fx, each of the piezoresistive elements FyR1 to FyR4 detects the force Fy, and each of the piezoresistive elements FzR1 to FzR4 and FzR1' to FzR4' detects the force Fz. Also, each of the piezoresistive elements MxR1 to MxR4 detects the moment Mx, each of the piezoresistive elements MyR1 to MyR4 detects the moment My, and each of the piezoresistive elements MzR1 to MzR4 and MzR1' to MzR4' detects the moment Mz.

In such a manner, in the sensor chip 100, each of the sensing blocks individually includes multiple piezoresistive elements. With this arrangement, when forces or displacements are respectively applied (transmitted) to the force point portions 151 to 154, the sensor chip 100 can detect up to six axes relating to forces in predetermined directions or moments about the respective directions (axis-directions), based on changes in the outputs of multiple piezoresistive elements on given beams. By changing the thickness and width of each detection beam, equalization of detection sensitivity, increases in detection sensitivity, or the like can be controlled.

By reducing the number of piezoresistive elements, a sensor chip for detecting five axes or less relating to displacements in predetermined axis directions can be provided.

Figure 12:
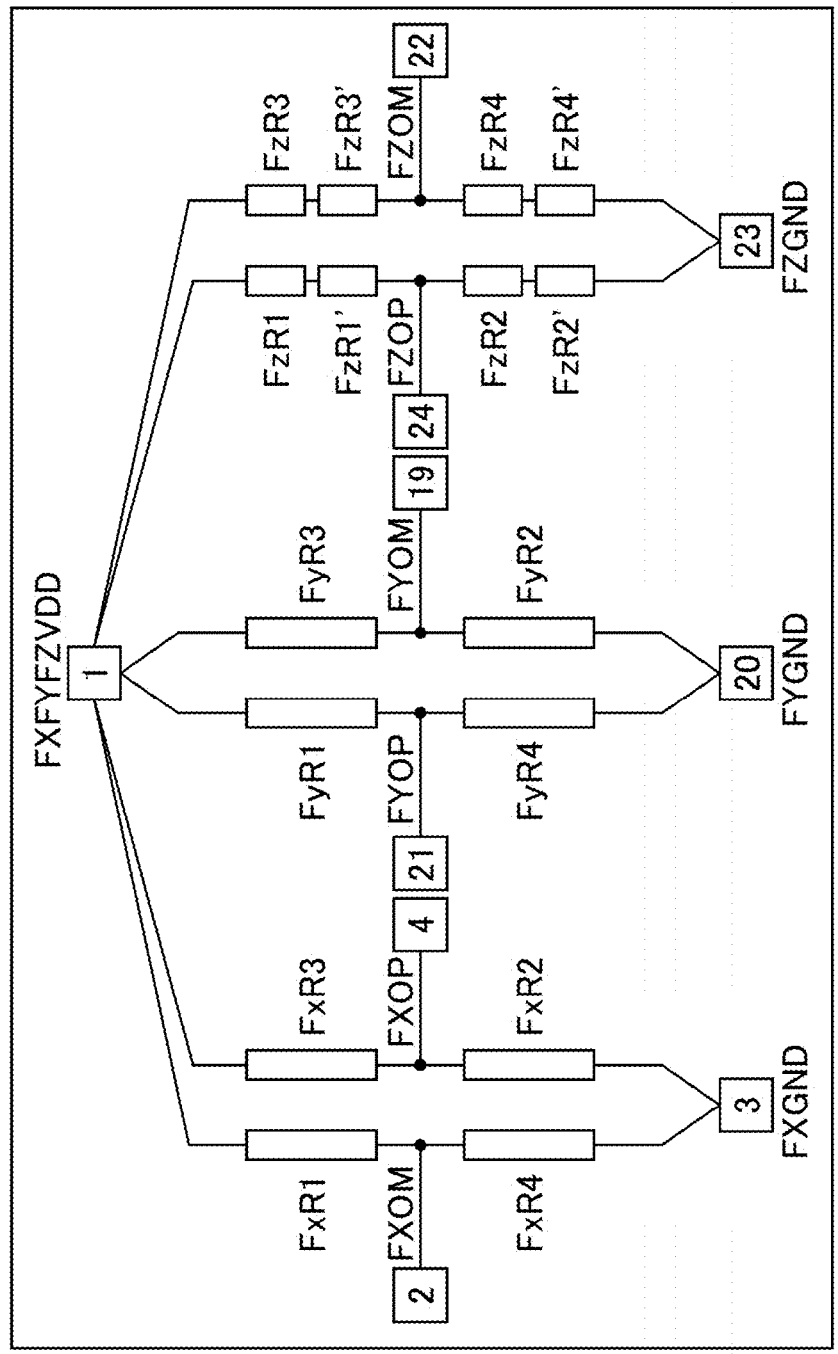
FIG. 12 is a diagram (first part) illustrating an example of a detecting circuit that uses piezoresistive elements.
Figure 13:
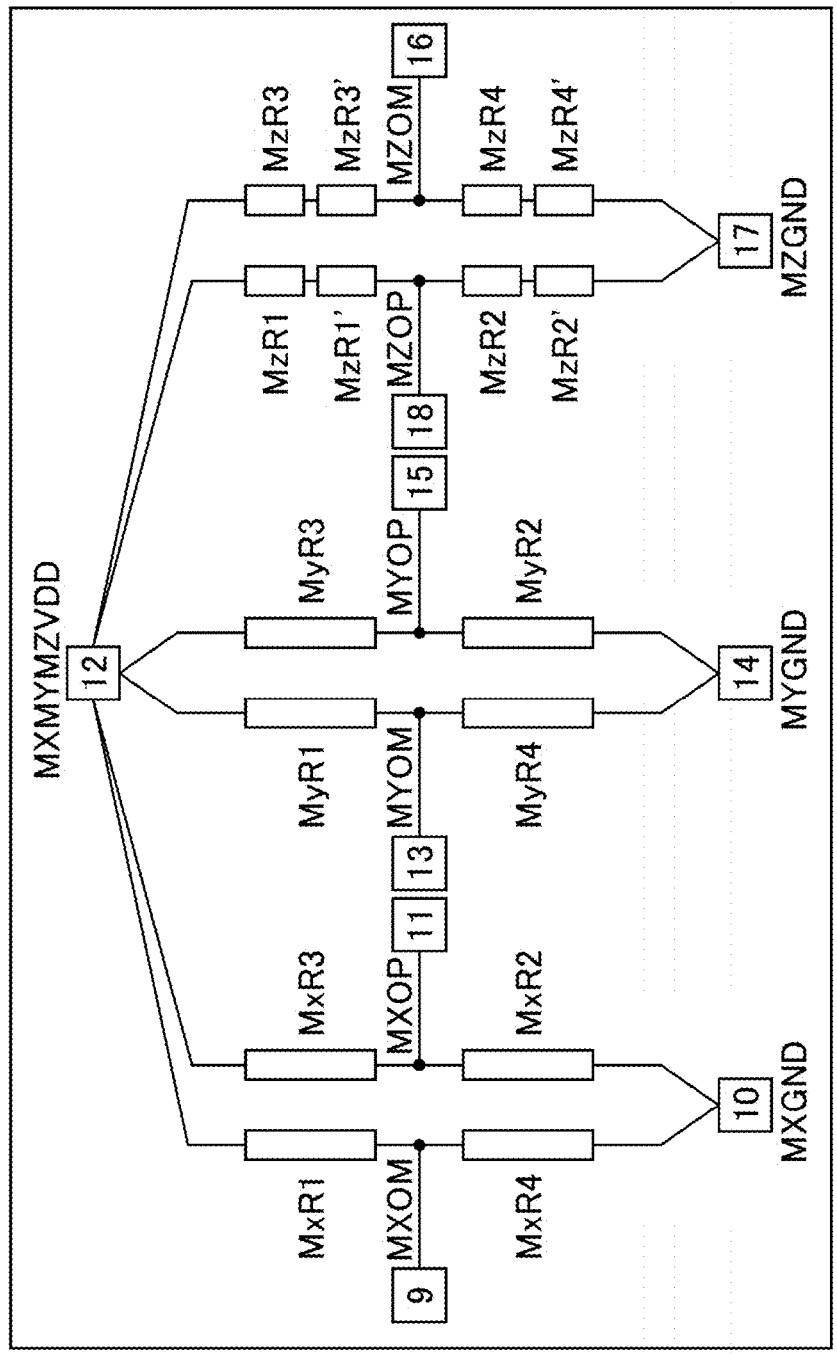
FIG. 13 is a diagram (second part) illustrating an example of the detecting circuit that uses piezoresistive elements.

In the sensor chip 100, for example, a detecting circuit described below can be used to detect forces and moments. Each of FIG. 12 and FIG. 13 illustrates an example of the detecting circuit that uses piezoresistive elements. In each of FIG. 12 and FIG. 13, numbers rounded with squares indicate external output terminals. For example, the number "1" indicates a power supply terminal for a Fx-axis, a Fy-axis, and a Fz-axis. The number "2" is a negative output terminal for the Fx-axis. The number "3" indicates a GND terminal for the Fx-axis, and the number "4" indicates a positive output terminal for the Fx-axis. The number "19" indicates a negative output terminal for the Fy-axis, the number "20" indicates a GND terminal for the Fy-axis, and the number "21" indicates a positive output terminal for the Fy-axis. The number "22" indicates a negative output terminal for the Fz-axis, the number "23" indicates a GND terminal for the Fz-axis, and the number "24" indicates a positive output terminal for the Fz-axis.

The number "9" indicates a negative terminal for the Mx-axis, the number "10" indicates a GND terminal for the Mx-axis, and the number "11" indicates a positive output terminal for the Mx-axis. The number "12" indicates a power supply terminal for the Mx-axis, My-axis, and Mz-axis. The number "13" indicates a negative output terminal for the My-axis, the number "14" indicates a GND terminal for the My-axis, and the number "15" indicates a positive output terminal for the My-axis. The number "16" indicates a negative output terminal for the Mz-axis, the number "17" indicates a GND terminal for the Mz-axis, and the number "18" indicates a positive output terminal for the Mz-axis.

Figure 14:
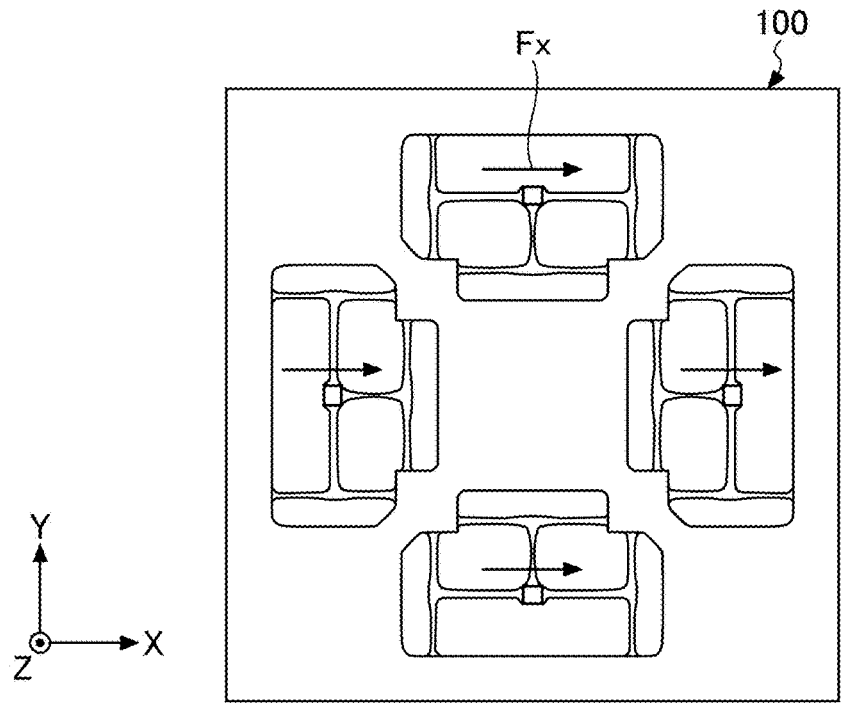
FIG. 14 is a diagram for describing an input Fx.
Figure 15:
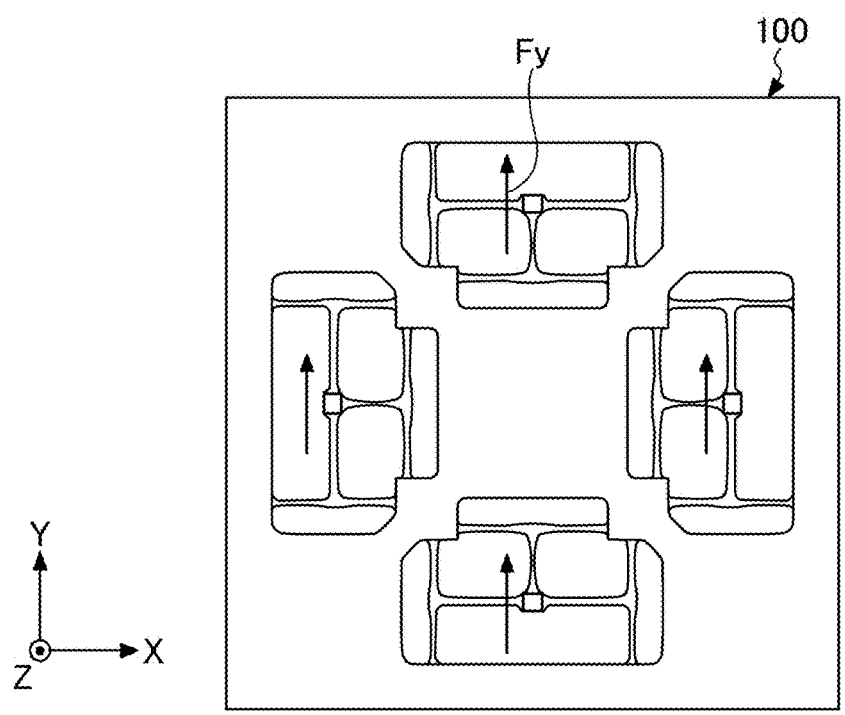
FIG. 15 is a diagram for describing an input Fy.

Hereafter, deformation of the detection beam will be described. FIG. 14 is a diagram describing an input Fx. FIG. 15 is a diagram for describing an input Fy. As illustrated in FIG. 14, when the input from the strain inducing body 200 to which the sensor chip 100 is attached is expressed by Fx, all of the four force point portions 151 to 154 attempt to move in the same direction (rightward direction in an example in FIG. 14). Similarly, as illustrated in FIG. 15, when the input from the strain inducing body 200 to which the sensor chip 100 is attached is expressed by Fy, all four force point portions 151 to 154 attempt to move in the same direction (upward direction in an example in FIG. 15). In this case, although the sensor chip 100 includes four sensing blocks, the respective force point portions in all sensing blocks move in the same direction, in accordance with displacements in the X-axis direction and Y-axis direction.

Figure 16:
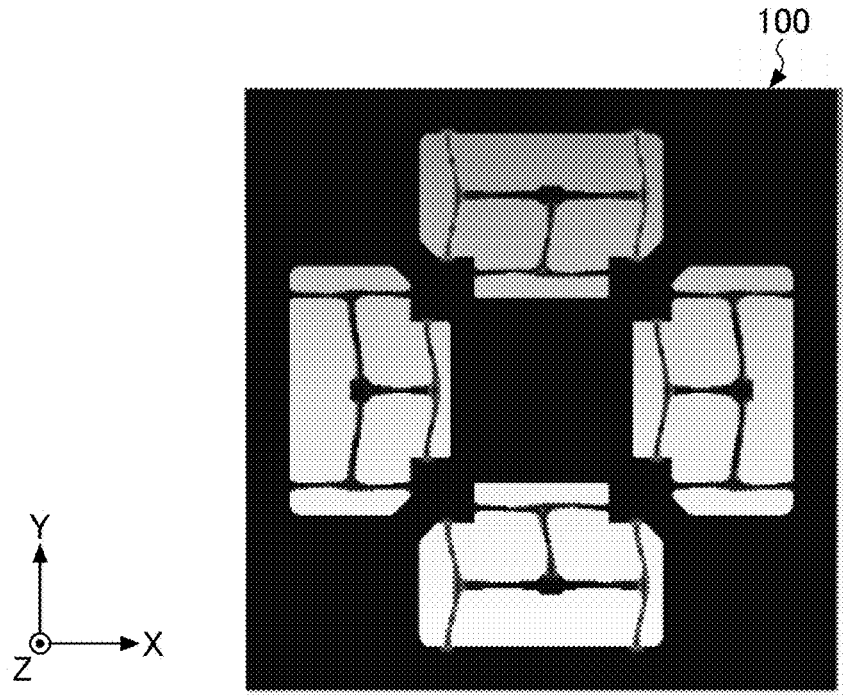
FIG. 16 is a diagram illustrating a simulation result when the input Fx is applied to the sensor chip.

FIG. 16 is a diagram illustrating a simulation result obtained when the sensor chip receives the input Fx. When the inputs Fx expressed by the arrows in FIG. 14 are applied, detection beams deform as illustrated in FIG. 16. In particular, it can be seen that one or more first detection beams (one or more beams in a lateral position in a given T-patterned beam structure) is greatly deformed in each sensing block.

In the sensor chip 100, each T-patterned beam structure includes one or more first detection beams that are among all first detection beams in a given T-patterned beam structure and are perpendicular to a displacement direction of the input. With this arrangement, such first detection beams perpendicular to the displacement direction of the input can deform greatly, as illustrated in FIG. 16. In FIG. 16, the first detection beams, which are perpendicular to the displacement direction of the input, include the first detection beams 131a, 131c, 132e, 133a, 133c, and 134e illustrated in FIG. 6 and the like.

Beams used to detect the inputs Fx include the first detection beams 131a, 131c, 133a, and 133c. Each beam among those beams is a first detection beam in a given T-patterned beam structure, and is at a fixed distance from a given force point portion. The beams used to detect the inputs Fy include the first detection beams 132a, 132c, 134a, and 134c. Each beam among those beams is a first detection beam in a given T-patterned beam structure, and is at a distance from a given force point portion.

In response to inputs Fx and the inputs Fy, first detection beams, on which the piezoresistive elements are disposed and that are each included in a given T-patterned beam structure, deform greatly, thereby effectively detecting the input forces. Also, beams not used to detect the inputs are designed to be greatly deformable in accordance with the displacement occurring when the inputs Fx and Fy are applied. With this arrangement, even if at least one input among the input Fx and the input Fy is increased, none of the detection beams are broken.

Conventional sensor chips include beams not being able to deform greatly in accordance with at least one given input among the inputs Fx and the inputs Fy. Thus, when at least one input among the input Fx and the input Fy is increased, the beams not being deformed might be broken. The sensor chip 100 can address the issue described above. That is, the sensor chip 100 can have increased fracture resistance of beams, even when displacements in various directions occur.

As described above, the sensor chip 100 includes one or more first detection beams perpendicular to the displacement direction of each input, and the one or more first detection beams perpendicular to the displacement direction can greatly deform. With this arrangement, the input Fx and the input Fy can be effectively detected. Also, even if at least one input among the input Fx and the input Fy is increased, none of the detection beams are broken. As a result, the sensor chip 100 can be used for any increased rating capacity, and a measurement range and load bearing can be also improved. For example, the sensor chip 100 may have a rating capacity of 500N, which is about 10 times greater than that of conventional chips.

In each sensing block, beams each extending in three directions in a given T-patterned beam structure are coupled to one another at a given force point portion, and deform so as to differ according to inputs. Thus, multi-axial forces can be detected more separately.

When beams are arranged in the T pattern, an increased number of paths that are each from a given beam to either a given frame or a given coupling portion is obtained. With this arrangement, a line is easily drawn to the outer periphery of the sensor chip. Therefore, layout flexibility can be improved.

Figure 17:
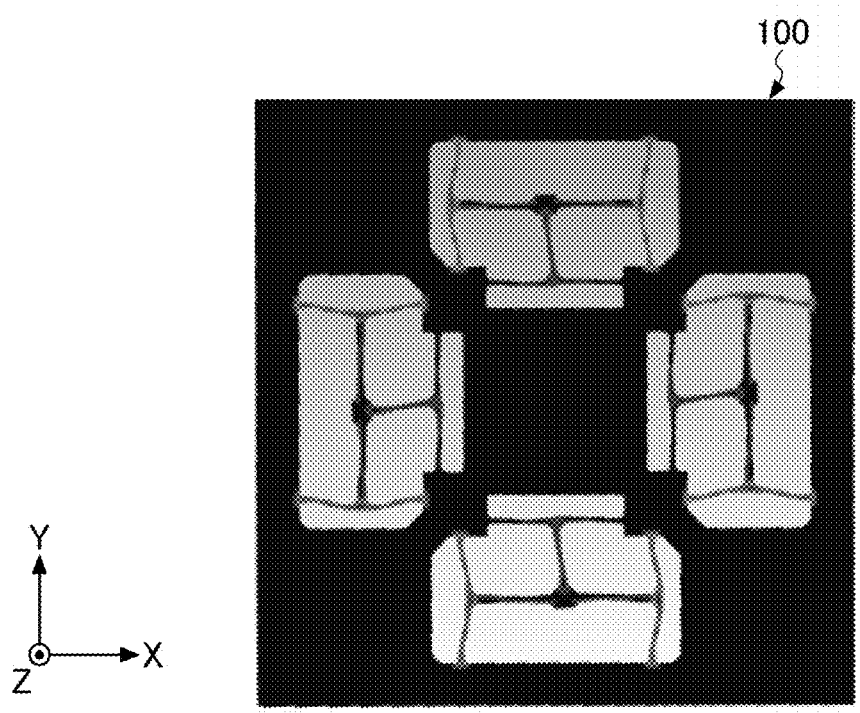
FIG. 17 is a diagram illustrating a simulation result when an input Mz is applied to the sensor chip.

FIG. 17 is a simulation result when the input Mz is applied to the sensor chip. As illustrated in FIG. 17, for given two first detection beams, between which a given force point portion is disposed and that are among the first detection beams 131a, 131c, 132a, 132c, 133a, 133c, 134a, and 134c, the given first detection beams greatly deform in response to the moment about the Z-axis direction. With this arrangement, piezoresistive elements can be disposed on some or all of the first detection beams.

FIG. 18 is a simulation result when the input Fz is applied to the sensor chip. FIG. 19 is a partial perspective view of the sensor chip illustrated in FIG. 18. As illustrated in FIG. 18 and FIG. 19, for given two second detection beams, which are directly connected to a given force point portion and are among the second detection beams 131b, 131d, 131f, 132b, 132d, 132f, 133b, 133d, 133f, 134b, 134d, and 134f, the given two second detection beams mainly deform greatly in response to the displacement in the Z-axis direction. With this arrangement, piezoresistive elements can be disposed on some or all of the second detection beams.

(Strain Inducing Body 200)

As illustrated in FIG. 1 and FIG. 2, the strain inducing body 200 includes the force receiving plate 210, the strain inducing portion 220, the input transmitter 230, and the cover plate 240. Each component of the strain inducing body 200 will be described below.

Figure 20:
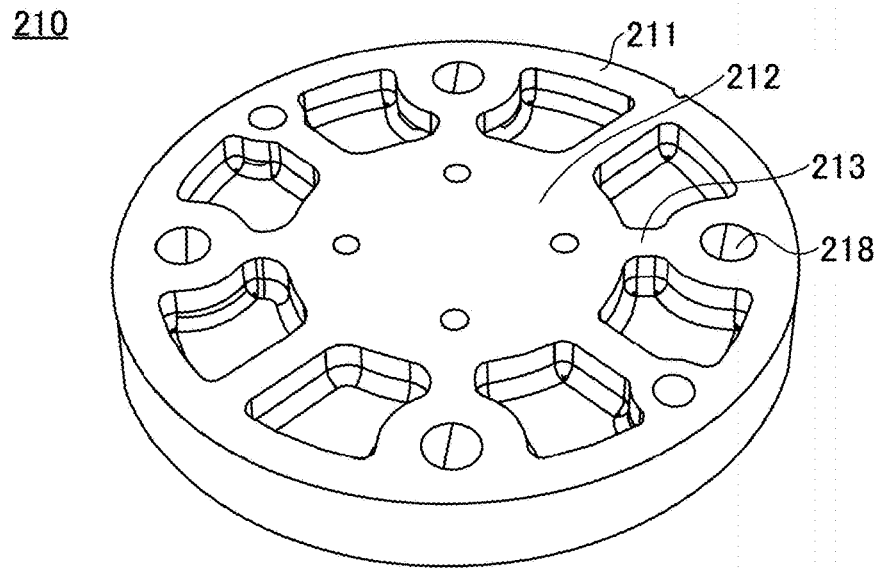
FIG. 20 is a perspective view of a force receiving plate included in a strain inducing body.

FIG. 20 is a perspective view of the force receiving plate included in the strain inducing body. As illustrated in FIG. 20, the force receiving plate 210 is a member that is substantially disk-shaped as a whole and receives the force and moment from a target object to be measured. The force receiving plate 210 includes an outer frame 211 that is substantially ring-shaped in a plan view, and includes a central portion 212 that is apart from the outer frame 211 and is disposed inside the outer frame 211, where the central portion 212 is substantially circular in a plan view. The force receiving plate 210 also includes multiple beam structures 213 each of which couples the outer frame 211 and the central portion 212. Even when the beam structure 213 causes increases in strength of the force receiving plate 210, and the force or moment is received through the target object, deformation of the force receiving plate 210 itself is negligible. With this arrangement, without the losses in the deformation (displacement), the force or moment is transmitted to the strain inducing portion 220 that is connected to the central portion 212. Through-holes 218 are each provided in a portion of the force receiving plate 210 that extends from the inside of the outer frame 211 toward each beam structure 213. The through-holes 218 can be used for, for example, screwing the force receiving plate 210 into the target object.

Figure 21:
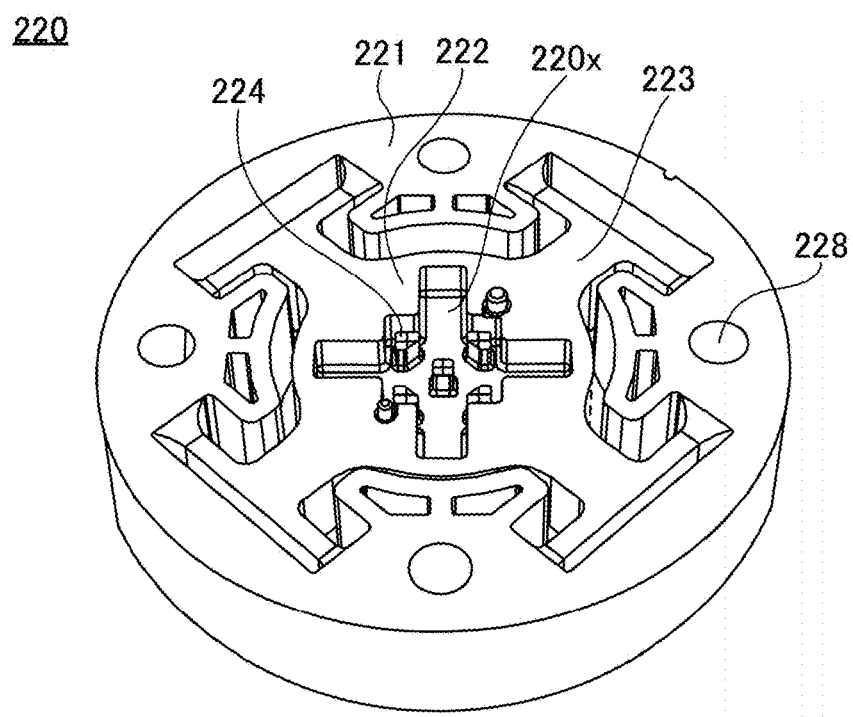
FIG. 21 is a perspective view of a strain inducing portion included in the strain inducing body.

FIG. 21 is a perspective view of the strain inducing portion included in the strain inducing body. As illustrated in FIG. 21, the strain inducing portion 220 is a substantially disk-shaped member as a whole, and deforms in response to receiving the force from the force receiving plate 210.

The strain inducing portion 220 includes an outer frame 221 that is substantially ring-shaped in a plan view, and includes a central portion 222 that is apart from the outer frame 221 and is disposed inside the outer frame 221, where the central portion 222 is substantially circular in a plan view. The strain inducing portion 220 also includes multiple beam structures 223 each of which couples the outer frame 221 and the central portion 222. For example, given beam structures are disposed so as to be point-symmetric with respect to the center of the strain inducing portion 220. The number of beam structures 223 is, for example, four. For example, each beam structure 223 includes a first beam and a second beam that extends from a middle portion of the first beam in a direction perpendicular to the first beam, where the first beam and the second beam are arranged in a T pattern. Both ends of the first beam are coupled to the outer frame 221, and one end of the second beam is coupled to the central portion 222.

The central portion 222 is formed to be thinner than the outer frame 221, and each beam structure 223 is further thinner than the central portion 222. The top surface of the central portion 222 and the top surface of each beam structure 223 are approximately the same plane and are located lower than the top surface of the outer frame 221. The bottom surface of the central portion 222 protrudes slightly from the bottom surface of the outer frame 221. The bottom surface of each beam structure 223 is located higher than the bottom surface of the outer frame 221 and the bottom surface of the central portion 222. Only the beam structures 223 and the central portion 222 deform in response to receiving the force from the force receiving plate 210, and the outer frame 221 does not deform. Although the central portion 222 moves in accordance with the deformation of each beam structure 223, the central portion 222 itself does not deform.

A groove 220x is formed at the surface of the central portion 222 toward the input transmitter 230. The shape of the groove 220x is a shape in which, in a plan view, a square groove portion overlaps with a cross-shaped groove portion that includes two elongated groove portions that are each longer than one side of the square groove portion and are perpendicular to each other. The depth of the square groove portion is the same as that of each cross-shaped groove portion.

First connection portions 224, which include five columnar portions each protruding toward the input transmitter 230, are respectively disposed at (i) four corners of the square groove portion other than the cross-shaped groove portion, and (ii) the center of the square groove portion. In this case, the first connection portions 224 do not contact an inner wall of the groove 220x. Each first connection portion 224 is a portion connected to a given support among the supports 101 to 105 in the sensor chip 100. The top surface of each first connection portion 224 is approximately in the same plane and is located lower than the top surface of the central portion 222 and the top surfaces of the beam structures 223. Through-holes 228 are provided in the outer frame 221. For example, with use of screws, the through-holes 228 can be used to secure the strain inducing portion 220, the input transmitter 230, and the cover plate 240, to a fixed side (a robot-side or the like).

A space is provided toward the top surface of the central portion 222. For example, a circuit board or the like that includes electronic components such as a connector and a semiconductor element may be disposed on the top surface of the central portion 222 so as not to enter the top surface of the outer frame 221.

Figure 22:
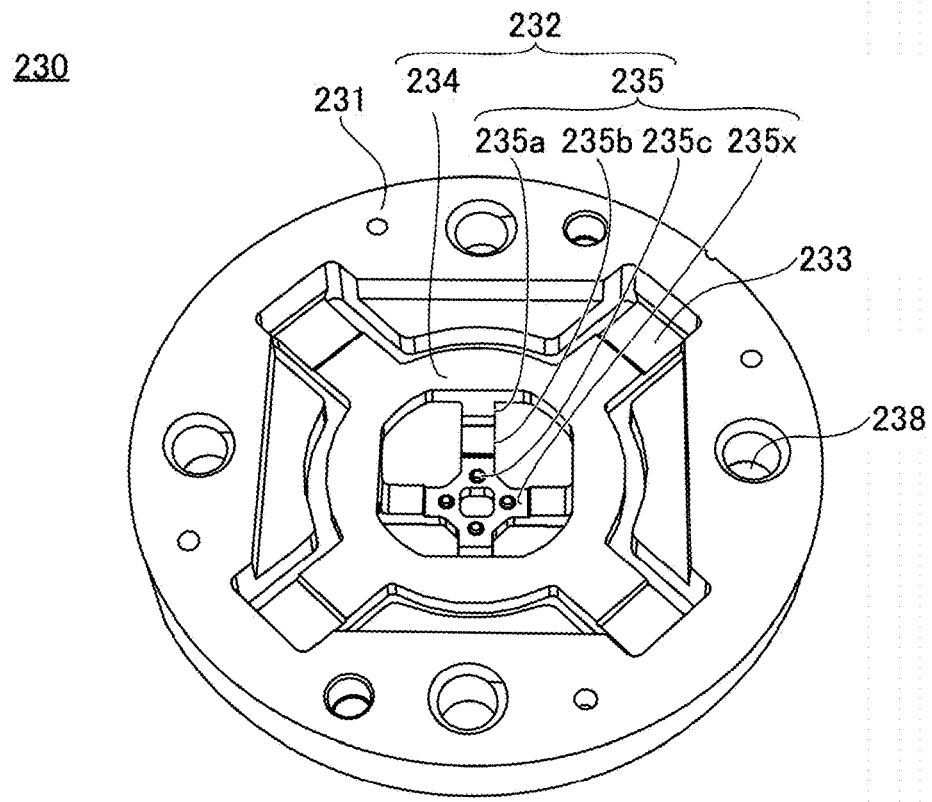
FIG. 22 is a perspective top view of an input transmitter included in the strain inducing body.
Figure 23:
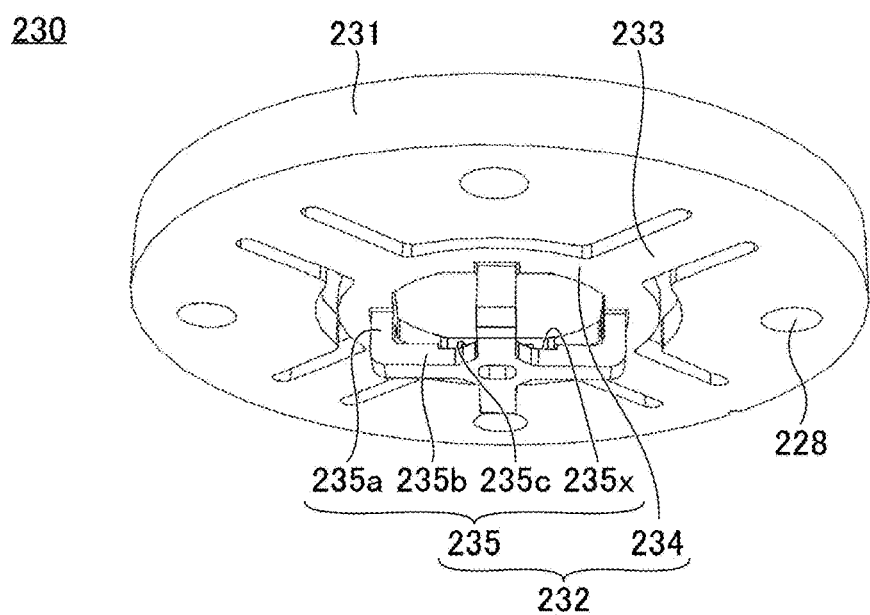
FIG. 23 is a perspective bottom view of the input transmitter included in the strain inducing body.
Figure 24:
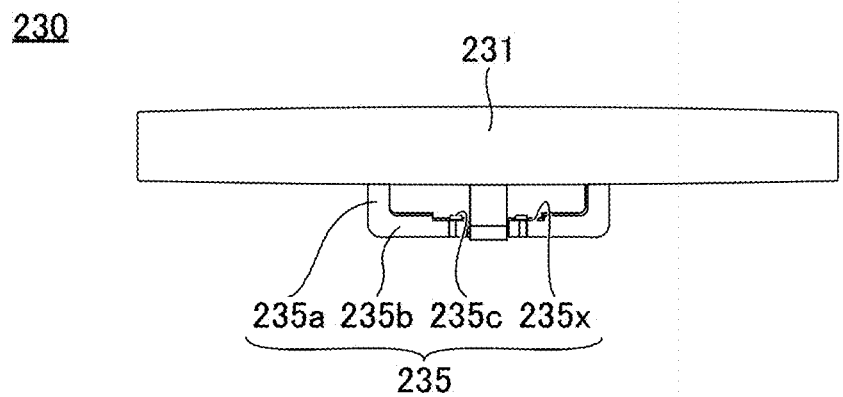
FIG. 24 is a side view of the input transmitter included in the strain inducing body.

FIG. 22 is a perspective top view of the input transmitter included in the strain inducing body. FIG. 23 is a perspective bottom view of the input transmitter included in the strain inducing body. FIG. 24 is a side view of the input transmitter included in the strain inducing body. As illustrated in FIGS. 22 to 24, the input transmitter 230 is a member that is substantially disk-shaped as a whole and transmits deformation (input) of the strain inducing portion 220 to the sensor chip 100.

The input transmitter 230 includes an outer frame 231 that is substantially ring-shaped in a plan view, and includes a central portion 232 that is apart from the outer frame 231 and is disposed inside the outer frame 231. The input transmitter 230 also includes multiple beam structures 233 each of which couples the outer frame 231 and the central portion 232. For example, given beam structures are disposed so as to be point-symmetric with respect to the center of the input transmitter 230. The number of beam structures 233 is, for example, four. Each beam structure 233 is, for example, I-shaped.

The central portion 232 includes an inner frame 234 that is substantially ring-shaped in a plan view and is connected to each of the beam structures 233. The central portion 232 also includes an accommodating portion 235 that is substantially cross-shaped in a plan view that extends from the bottom surface of the inner frame 234 toward the strain inducing portion 220. The accommodating portion 235 includes four vertical supports 235a each of which extends vertically from the bottom surface of the inner frame 234 toward the strain inducing portion 220. The accommodating portion 235 also includes four horizontal supports 235b each of which extends horizontally from the bottom end of a given vertical support 235a and is coupled at the center of the inner frame 234.

The beam structures 233 and the inner frame 234 are each formed to be thinner than the outer frame 231. The top surfaces of the beam structures 233 and the inner frame 234 are each disposed lower than the top surface of the outer frame 231. The bottom surface of the outer frame 231, the bottom surfaces of the beam structures 233, and the bottom surface of the inner frame 234 are substantially in the same plane. The input transmitter 230 does not deform even when any component of the input transmitter 230 receives the force or moment.

In a plan view, given vertical supports among the four vertical supports 235a are disposed so as to be point-symmetric with respect to the center of the input transmitter 230, and given horizontal supports among the four horizontal supports 235b are disposed so as to be point-symmetric with respect to the center of the input transmitter 230. In a plan view, the longitudinal direction of each horizontal supports 235b is not the same as the longitudinal direction of a corresponding beam structure 233. For example, in a plan view, the longitudinal direction of each horizontal support 235b and the longitudinal direction of a corresponding beam structure 233 are disposed at an offset by 45 degrees.

Grooves 235x are provided near the center of the substantially cross-shaped accommodating portion 235, and the bottom surface of each groove 235x is arranged such that a corresponding second connection portion 235c protruding toward the cover plate 240 does not contact the inner wall of the groove 235x. Each second connection portion 235c is substantially located on a line that is determined by bisecting a corresponding horizontal support 235b in the longitudinal direction. Each second connection portion 235c is a portion connected to a given force point portion among the force point portions 151 to 154 in the sensor chip 100. Through-holes 238 are provided in the outer frame 231. The through-holes 238 can be used to, for example, screw the strain inducing portion 220, the input transmitter 230, and the cover plate 240, into the fixed side (robot-side or the like).

A space is provided toward the top surface of each beam structure 233. For example, a circuit board or the like that includes electronic components such as a connector and a semiconductor element may be disposed on the top surface of each beam structure 233 so as not to enter the top surface of the outer frame 221.

Figure 25:
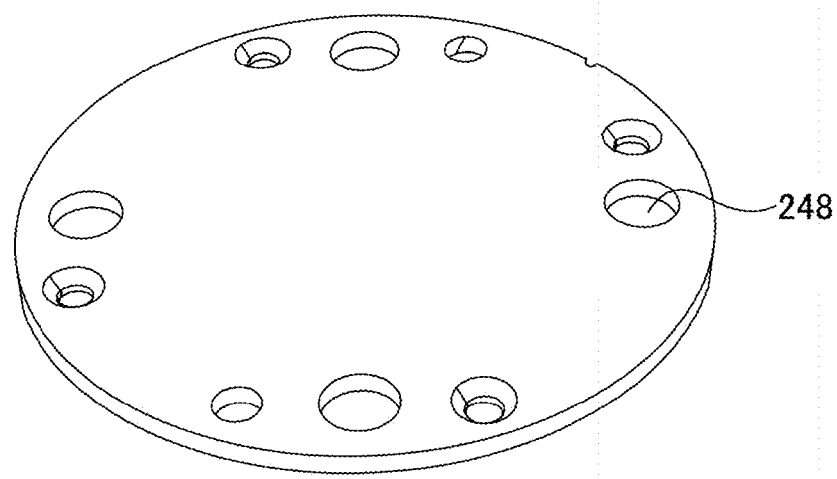
FIG. 25 is a perspective view of a cover plate included in the strain inducing body.

FIG. 25 is a perspective view of the cover plate included in the strain inducing body. As illustrated in FIG. 25, the cover plate 240 is a disk-like member as a whole and protects internal components (the sensor chip 100 and the like). The cover plate 240 is formed to be thinner than the force receiving plate 210, the strain inducing portion 220, and the input transmitter 230. Through-holes 248 are provided in the cover plate 240. For example, the through-holes 248 can be used to screw the strain-inducing portion 220, the input transmitter 230, and the cover plate 240, to the fixed side (robot-side or the like).

For example, a hard metallic material, such as SUS (stainless steel), can be used as the material of each of the force receiving plate 210, the strain inducing portion 220, the input transmitter 230, and the cover plate 240. In this regard, it is preferable to use stainless steel of SUS 630 specified by the Japanese industrial standards (JIS). Such stainless steel is hard and has increased mechanical strength. For components included in the strain inducing body 200, it is desirable for the force receiving plate 210, the strain inducing portion 220, and the input transmitter 230 to be firmly connected to one another, or to be integrally configured. As a method of connecting the force receiving plate 210, the strain inducing portion 220, and the input transmitter 230, fastening may be performed with screws. Alternatively, welding or the like may be performed. In any case, those components of the strain inducing body 200 need to sufficiently withstand the force and moment that is input to the strain inducing body 200.

In the present embodiment, for example, the force receiving plate 210, the strain inducing portion 220, and the input transmitter 230 are each fabricated by injection molding that uses metal powder, and then sintering of these fabricated components that are layered is again performed so that they are diffusion-welded. The force receiving plate 210, the strain inducing portion 220, and the input transmitter 230 that are diffusion-welded have necessary and sufficient welding strength. The cover plate 240 may be fastened to the input transmitter 230 by, for example, one or more screws, after mounting of the sensor chip 100 and other internal components.

When the force or moment is applied to the force receiving plate 210 in the strain inducing body 200, the force or moment is transmitted to the central portion 222 of the strain inducing portion 220 connected to the force receiving plate 210, and thus each of four beam structures 223 deforms in response to receiving a given input. In this case, the outer frame 221 and the input transmitter 230 in the strain inducing portion 220 do not deform.

In such a manner, in the strain inducing body 200, each of the force receiving plate 210, the central portion 222 of the strain inducing portion 220, and the beam structures 223 is a movable portion that deforms in response to receiving a predetermined axial force or moment about a predetermined axis. The outer frame 221 of the strain inducing portion 220 is a non-movable portion that does not deform in response to receiving the force or moment. The input transmitter 230, which is joined to the outer frame 221, as a non-movable portion, of the strain inducing portion 220, is a non-movable portion that does not deform in response to receiving the force or moment. Likewise, the cover plate 240, which is joined to the input transmitter 230, is a non-movable portion that does not deform in response to the force or moment.

When the strain inducing body 200 is used in the force sensor device 1, the supports 101 to 105 of the sensor chip 100 are respectively connected to the first connection portions 224 provided on the central portion 222 that is a movable portion. Also, the force point portions 151 to 154 of the sensor chip 100 are respectively connected to the second connection portions 235c that are provided in the accommodating portion 235, which is a non-movable portion. With this arrangement, the sensor chip 100 operates such that detection beams deform through the respective supports 101 to 105, without the movement of the force point portions 151 to 154.

In another example, the strain inducing body 200 may be configured, such that the force point portions 151 to 154 of the sensor chip 100 are respectively connected to the first connection portions 224 that are provided at the central portion 222, which is a movable portion and such that the supports 101 to 105 of the sensor chip 100 are respectively connected to the second connection portions 235c that are provided in the accommodating portion 235, which is a non-movable portion.

In such a case, the sensor chip 100 that can be accommodated in the accommodating portion 235 includes the supports 101 to 105 and the force point portions 151 to 154, where the positional relationship between supports, as well as the positional relationship between force point portions, change in response to receiving a force or moment. In the strain inducing body 200, the central portion 222 that is a movable portion includes first connection portions 224 each of which extends toward the input transmitter 230 and is connected to both a given support among the supports 101 to 105 and one end of a given force point portion among the force points 151 to 154. The accommodating portion 235 includes second connection portions 235c each of which is connected to both the given support among the support 101 to 105 and another end of the given force portion among the force point portions 151 to 154.

Figure 26:
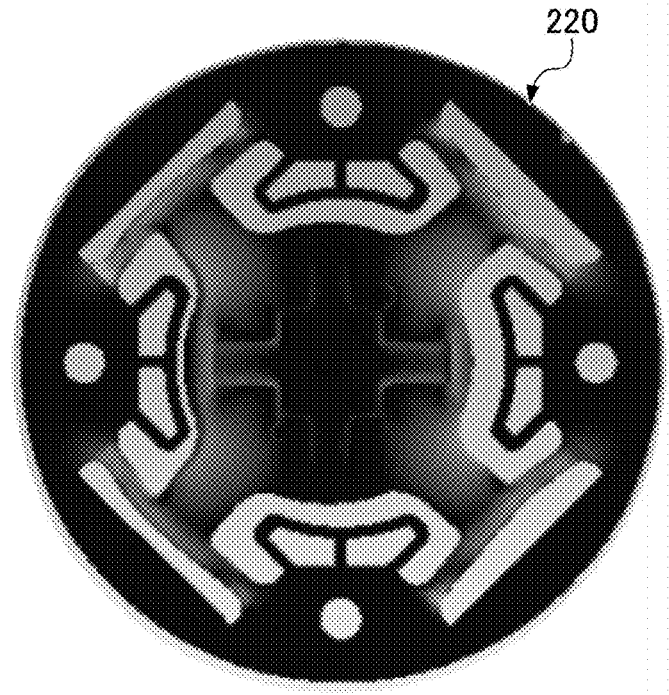
FIG. 26 is a diagram illustrating the simulation result when the input Fx is applied to the strain inducing portion.
Figure 27:
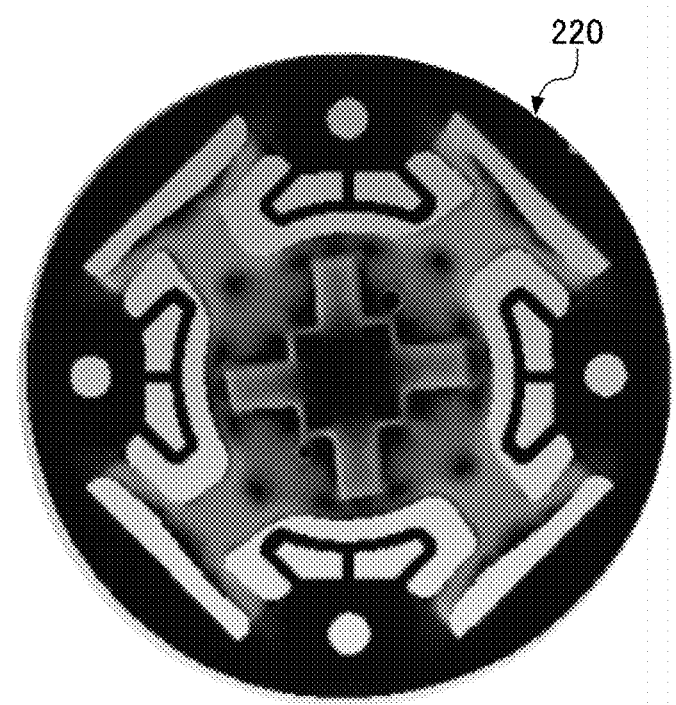
FIG. 27 is a diagram illustrating the simulation result when the input Mz is applied to the strain induction section.

FIG. 26 is a diagram illustrating a simulation result when the input Fx is applied to the strain inducing portion. FIG. 27 is a diagram illustrating a simulation result when the input Mz is applied to the strain inducing portion. As illustrated in FIG. 26 and FIG. 27, it can be seen in both cases that four T-patterned beam structures 223 are deformed without the outer frame 221 of the strain inducing portion 220 being deformed. The same applies to a case where other inputs are applied.

With this arrangement, the strain inducing body 200 converts the input force or moment to a given displacement to thereby transmit it to the sensor chip 100 that is provided in the strain inducing body 200. In conventional strain inducing bodies that have similar functions, a structure that receives forces and moments, as well as a structure that transmits displacements, are integrally configured or closely coupled to each other. For this reason, there is an increased trade-off between the displacement and load bearing and consequently it is particularly difficult to increase the load bearing.

In the strain inducing body 200, the strain inducing portion 220 that receives forces and moments, as well as the input transmitter 230 that transmits the displacement to the sensor chip 100, are formed as separate structures. With this arrangement, displacement can be appropriately detected, while increasing load bearing.

<First Modification of the First Embodiment>

A first modification of the first embodiment illustrates an example of the sensor chip having a different structure from that of the sensor chip described in the first embodiment. In the first modification of the first embodiment, description for the same configuration that has been the same as that in the above embodiments may be omitted.

Figure 28:
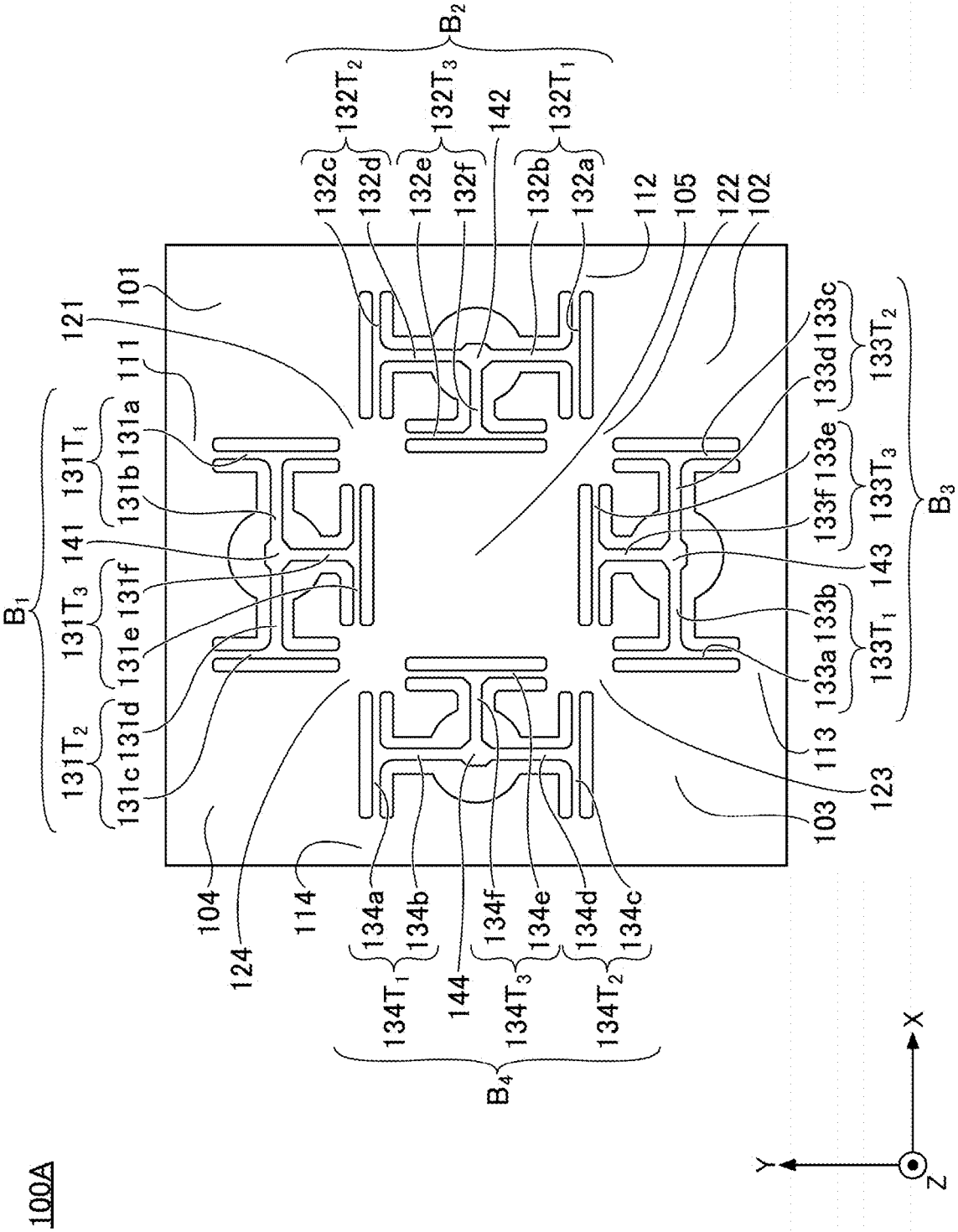
FIG. 28 is a plan view of a sensor chip 100A when viewed in the positive Z-axis direction.

FIG. 28 is a plan view of a sensor chip 100A when viewed in the positive Z-axis direction. As illustrated in FIG. 28, the sensor chip 100A has a detection beam structure as in the structure of the sensor chip 100 (see FIG. 6 and the like). However, a space shape defined in the surroundings of each detection beam differs from that defined in the sensor chip 100. In other words, in the sensor chip 100A, opening widths of spaces provided at both sides of each detection beam are the same in a plan view.

In general, beam structures of sensor chips are formed using a silicon wafer in a semiconductor process, where a deep etch is performed by dry etching. If some opening widths in etched regions that are separated by detection beams are greater and are not the same, as in those determined in the shape of the sensor chip 100, it might be more difficult to process the wafer, thereby resulting in reductions in processing quality.

In the sensor chip 100A, an elongated etching region having the same opening width is formed over both sides of each detection beam. With this arrangement, when a deep etch is performed by dry etching, processing difficulty is reduced, thereby increasing processing quality. In FIG. 28, four circular openings are undercuts used to cause the sensor chip 100A to prevent the contact with the strain inducing body 200, when the sensor chip 100A is attached to the strain inducing body 200. If only efficiency in dry etching is considered, the four circular openings may not be provided.

Figure 29:
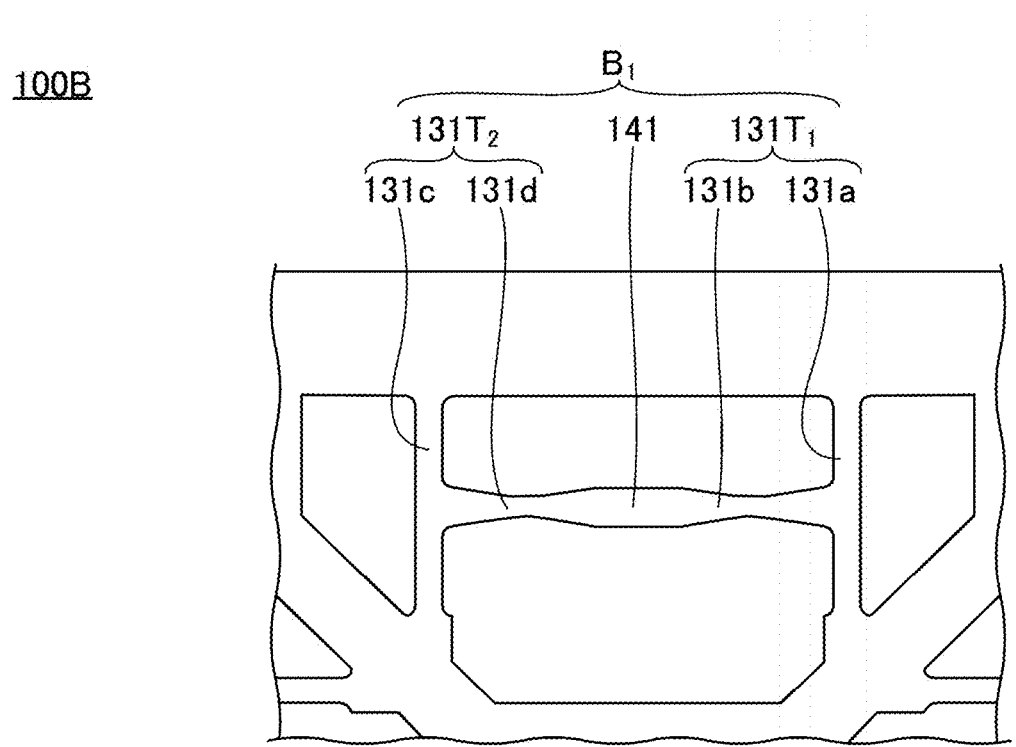
FIG. 29 is a partial plan view of a sensor chip 100B when viewed in the positive Z-axis direction.

FIG. 29 is a partial plan view of a sensor chip 100B when viewed in the positive Z-axis direction. As illustrated in FIG. 29, the sensor chip 100B differs from the sensor chip 100 (see FIG. 6 and the like) in that one ends of respective second detection beams included in two T-patterned beam structures are connected to each other each at one end in the sensing block $B_1$. In the sensor chip 100, respective second detection beams included in three T-patterned beam structures are connected to one another each at one end. In contrast to the sensor chip 100, the sensor chip 100B does not include first detection beams 131e, 132e, 133e, and 134e, as well as second detection beams 131f, 132f, 133f, and 134*f*. The structure in each of sensing blocks $B_2$ to $B_4$ is the same as that in the sensing block $B_1$.

Figure 30:
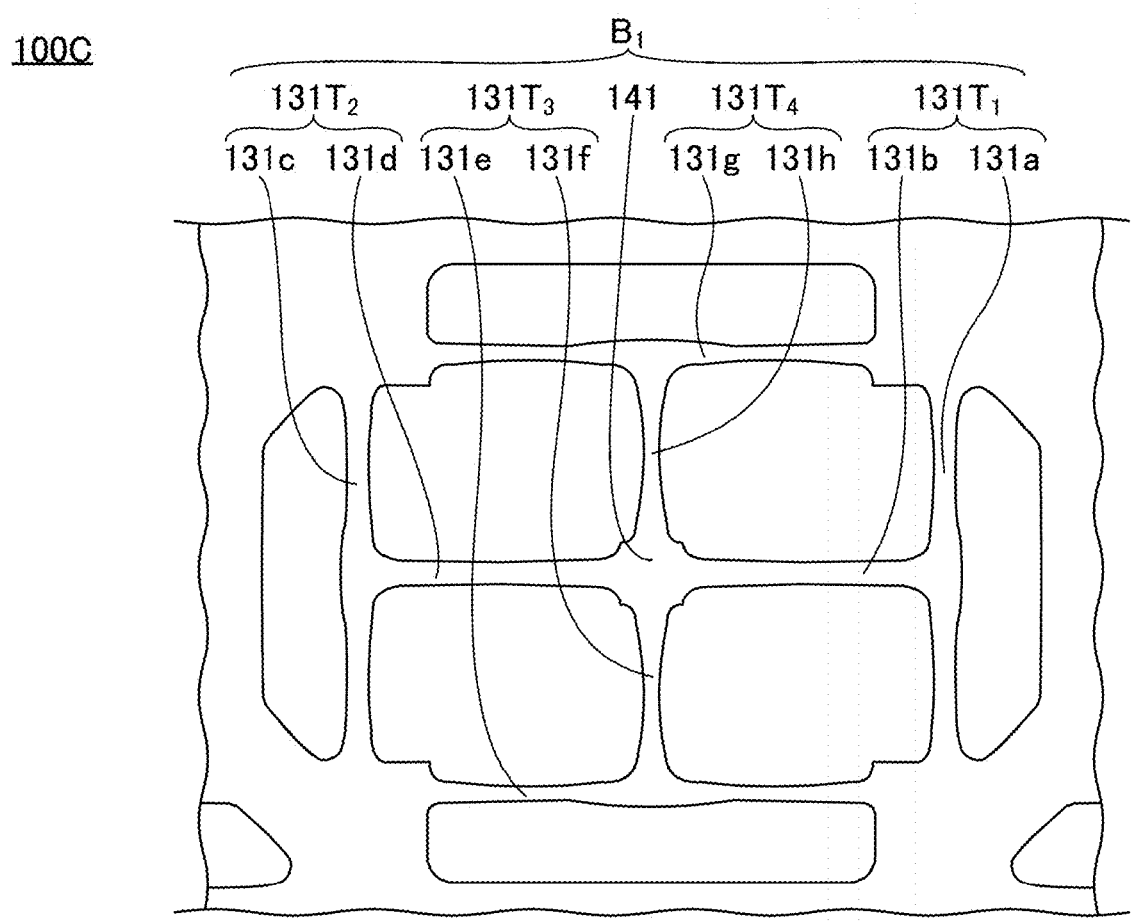
FIG. 30 is a partial plan view of a sensor chip 100C when viewed in the positive Z-axis direction.

FIG. 30 is a partial plan view of a sensor chip 100C when viewed from the positive Z-axis direction. As illustrated in FIG. 30, the sensor chip 100C differs from the sensor chip 100 (see FIG. 6 and the like) in that respective second detection beams included in four T-patterned beam structures are connected to one another each at one end in the sensing block $B_1$. In the sensor chip 100, respective second detection beams in three T-patterned beam structures are connected to one another each at one end. In contrast to the sensor chip 100, the sensor chip 100C further includes a T-patterned beam structure $131T_4$ that includes a first detection beam 131*g* and a second detection beam 131*h*. The T-patterned beam structure $131T_4$ is disposed such that the connection portion 141 is interposed between the T-patterned beam structure $131T_3$ and the T-patterned beam structure $131T_4$. The structure in each of sensing blocks $B_2$ to $B_4$ is the same as that in the sensing block $B_1$.

As described above, the T-patterned beam structure is not limited to having three beams in a given sensor chip. The T-patterned beam structure may include two beams as in the sensor chip 100B. Alternatively, the T-patterned beam structure may include four beams as in the sensor chip 100C. In both cases, when each sensing block includes two or more T-patterned beam structures, one or more first detection beams or one or more second detection beams included in a given T-patterned beam structure can greatly deform. With this arrangement, at least one input among the input Fx and the input Fy can be detected effectively. Further, even if one input among the input Fx and the input Fy is increased, any detection beams are not broken. That is, in any sensor chip, fracture resistance of beams with respect to displacements in various directions can be improved. Therefore, the sensor chip can be used for increased rating capacity, as well as having an increased measurement range and load bearing.

When two T-patterned beam structures are used, it is difficult to detect displacements in 6-axis directions. When the number of T-patterned beam structures is increased, it is advantageous in that it is easier to isolate forces of multiple axes. However, the chip size may be likely to be increased. In view of the point described above, it is preferable to use three T-patterned beam structures in order to detect displacements in the 6-axis directions.

<Second Modification of the First Embodiment>

A second modification of the first embodiment illustrates an example of the strain inducing body having a different structure from that in the first embodiment. In the second modification of the first embodiment, description for the same configuration that has been described in the above embodiments may be omitted.

Figure 31:
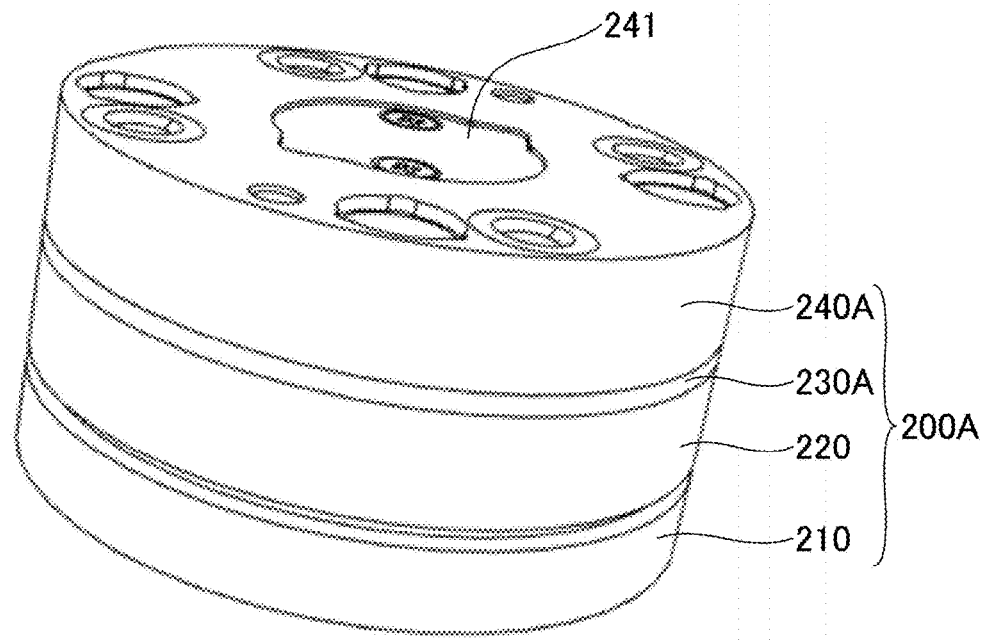
FIG. 31 is a perspective view of a strain inducing body 200A.
Figure 32:
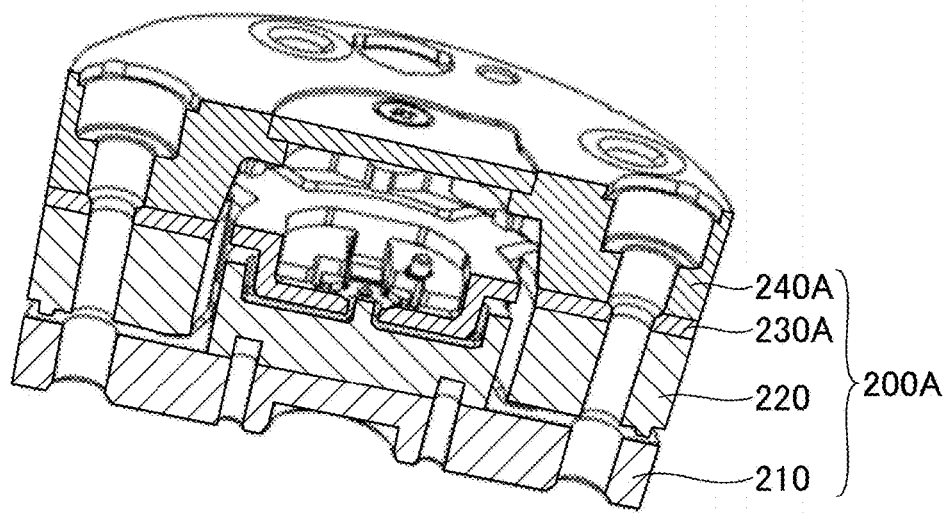
FIG. 32 is a cross-sectional perspective view of the strain inducing body 200A.

FIG. 31 is a perspective view of a strain inducing body 200A. FIG. 32 is a cross-sectional perspective view of the strain inducing body 200A. Referring to FIG. 31 and FIG. 32, the strain inducing body 200A includes the force receiving plate 210, the strain inducing portion 220, an input transmitter 230A, and a cover plate 240A. The strain inducing portion 220 is layered on the force receiving plate 210, and the input transmitter 230A is layered on the strain inducing portion 220. The cover plate 240A is layered on the input transmitter 230A. With this arrangement, the strain inducing portion 200A is formed to be substantially cylindrical as a whole. The central portion of the cover plate 240A can be opened and closed by an inner lid portion 241. The force receiving plate 210 and the strain inducing portion 220 are configured as in the strain inducing body 200.

Figure 33:
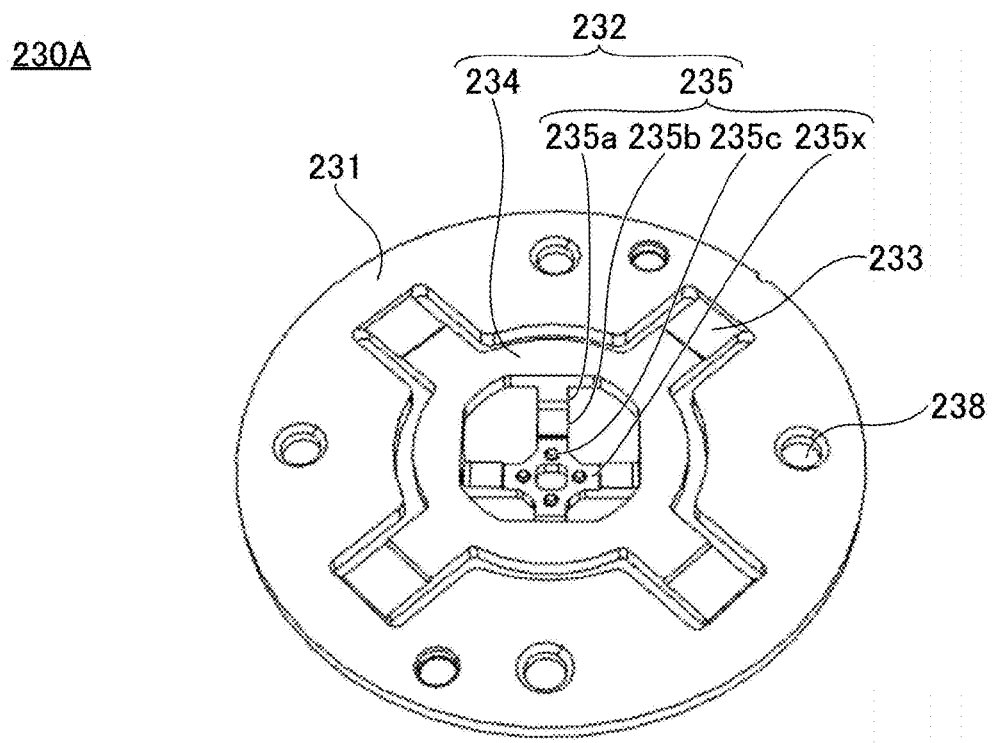
FIG. 33 is a perspective view of the input transmitter included in the strain inducing body.

FIG. 33 is a perspective top view of the input transmitter included in the strain inducing body. As illustrated in FIG. 33, the input transmitter 230A has the same basic structure as that of the input transmitter 230. However, the input transmitter 230A is formed to be thinner than the input transmitter 230.

Figure 34:
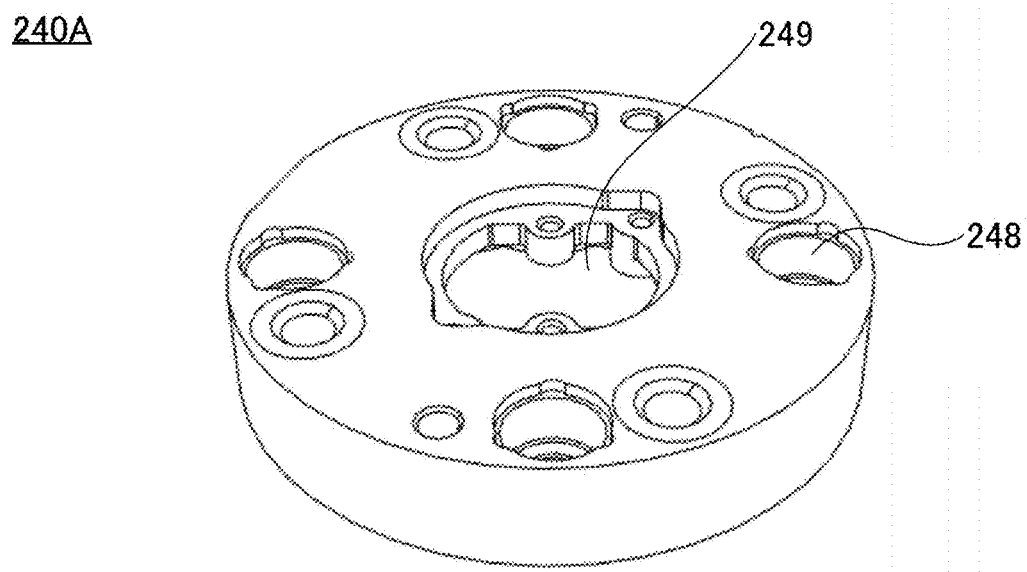
FIG. 34 is a perspective view of the cover plate included in the strain inducing body.

FIG. 34 is a perspective view of the cover plate included in the strain inducing body. As illustrated in FIG. 34, the cover plate 240A is a member that is substantially disk-shaped as a whole and protects internal components (the sensor chip 100 and the like). For example, the cover plate 240A is formed to be thicker than the force receiving plate 210, the strain inducing portion 220, and the input transmitter 230A, and has a wide internal space toward the input transmitter 230A. The cover plate 240A has through-holes 248 and 249. The through-hole 249 is closed by the inner lid portion 241 (see FIG. 31).

As described above, a boundary between given components included in the strain inducing body can be changed in consideration of (i) an internal space provided in the strain inducting body, (ii) an assembling level, and (iii) the like. In the example illustrated in FIGS. 31 to 34, the boundary between the input transmitter and the cover plate is changed in comparison to the case illustrated in FIG. 1 and the like. In this case, a wide internal space toward the cover plate 240A can be provided and thus more components can be incorporated in the space.

(Third Modification of the First Embodiment)

A third modification of the first embodiment illustrates another example of the strain inducing body having a different structure from that described in the first embodiment. In the third modification of the first embodiment, description for the configuration that is the same as that described in the above embodiments may be omitted.

Figure 35:
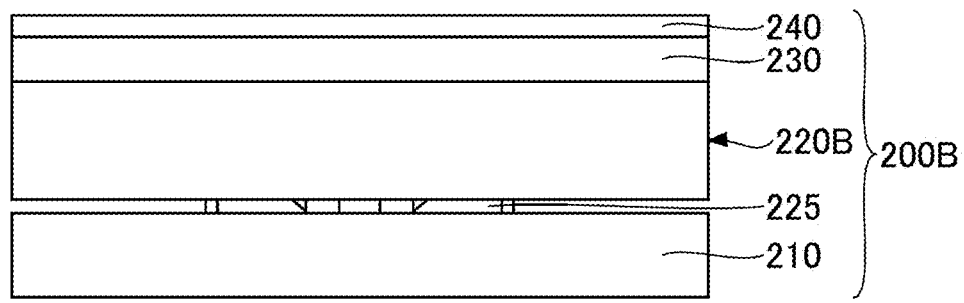
FIG. 35 is a side view of a strain inducing body 200B.

FIG. 35 is a side view of a strain inducing body 200B. Referring to FIG. 35, the strain inducing body 200B includes the force receiving plate 210, a strain inducing portion 220B, the input transmitter 230, and the cover plate 240. The strain inducing portion 220B is layered on the force receiving plate 210, the input transmitter 230 is layered on the strain inducing portion 220B, and the cover plate 240 is layered on the input transmitter 230. With this arrangement, the strain inducing portion 200B is formed to be substantially cylindrical as a whole. The force receiving plate 210, the input transmitter 230, and the cover plate 240 are configured as in the strain inducing body 200.

Figure 36:
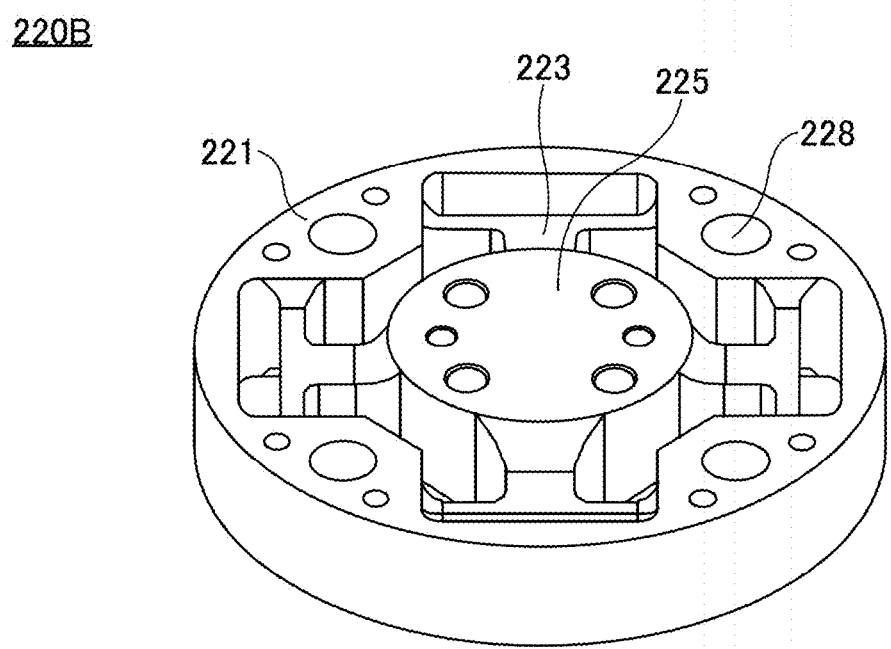
FIG. 36 is a perspective bottom view of the strain inducing portion included in the strain inducing body.

FIG. 36 is a perspective bottom view of the strain inducing portion included in the strain inducing body. In FIG. 36, the strain inducing portion 220B is inverted up-down from FIG. 35. As illustrated in FIG. 35 and FIG. 36, the strain inducing portion 220B has a protrusion 225 that protrudes toward the force receiving plate 210. The protrusion 225 is substantially circular in a plan view and is configured to be in contact with the central portion 212 of the force receiving plate 210. A protruding amount of the protrusion 225 from the bottom surface of the strain inducing portion 220B is, for example, about 0.5 mm. The protrusion 225 is bonded to the central portion 212 of the force receiving plate 210, by, for example, diffusion bonding. However, fastening may be performed with screws, or welding may be performed. After the strain inducing portion 220B and the force receiving plate 210 are bonded to each other, a space provided between the strain inducing portion 220B and the force receiving plate 210 is defined by the height of the protrusion 225.

A space needs to be provided between the strain inducing portion 220B and the force receiving portion 210, in order for the force receiving portion 210 to deform in response to receiving a force. By providing the protrusion 225 in the strain inducing portion 220B, the space can be easily provided between the force receiving portion 210 and the strain inducing portion 220B, in the strain inducing body 200B. That is, by providing the protrusion 225 in the strain inducing portion 220B, the height of the protrusion 225 can be adjusted, and thus the space between the strain inducing portion 220B and the force receiving plate 210 can be adjusted. For example, if the height of the protrusion 225 is precisely adjusted by polishing or the like, prior to bonding of the strain inducing portion 220B and the force receiving plate 210, the space provided after the bonding can be adjusted as appropriately. Further, in a method of providing the protrusion 225 in the strain inducing portion 220B, a narrow space, which is difficult to form by machining such as bonding or wire cutting, can be formed. When the strain inducing portion 220B and the force receiving plate 210 are bonded by diffusion bonding, bonding strength corresponding to material strength is obtained.

The protrusion may be provided on the side of the force receiving plate 210. Alternatively, protrusions may be respectively provided on both the strain inducing portion 220B and the force receiving plate 210. In any case, one or more protrusions are provided between the strain inducing portion 220B and the force receiving plate 210, and function as a space-defining portion for defining a given space between the strain inducing portion 220B and the force receiving plate 210.

Although the preferred embodiments have been described in detail above, various modifications and substitutions can be made to the embodiments described above without departing from the scope defined in the present disclosure.

What is claimed is:

1. A sensor chip comprising:
   multiple sensing blocks each of which includes two or more T-patterned beam structures, each T-patterned beam structure including
      strain-detecting elements,
      at least one first detection beam,
      a second detection beam extending from the first detection beam in a direction perpendicular to the first detection beam;
   multiple connection portions each of which is formed by coupling ends of second detection beams in respective T-patterned structures included in each of the sensing blocks, each connection portion including a force point portion; and
   a surrounding structure that surrounds perimeters of the multiple sensing blocks,
   wherein the sensor chip is configured to detect up to six axes relating to predetermined axial forces or moments around predetermined axes, based on a change in an output of each of the strain-detecting elements, the output of each strain-detecting element changing in accordance with an input applied to a given force point portion, and
   wherein respective first detection beams in two T-patterned beam structures, among the two or more T-patterned beam structures, are parallel to each other, the first detection beam of each of the two T-patterned beam structures including a first end and a second end opposite the first end, and
   wherein the first detection beam in each of the two T-patterned beam structures is coupled to the surrounding structure at a corresponding first end and second end.

2. The sensor chip according to claim 1, wherein the at least one first detection beam is perpendicular to a displacement direction of the input.

3. The sensor chip according to claim 1, wherein given sensing blocks are point-symmetric with respect to the center of the sensor chip, in a plan view.

4. The sensor chip according to claim 1, wherein the multiple sensing blocks include only four sensing blocks.

5. The sensor chip according to claim 4, further comprising:
   first supports disposed at four corners of the sensor chip of which a planar shape is a rectangle;
   a second support disposed at the center of the rectangle;
   frames each of which couples given first supports, the given first supports being next to each other; and
   coupling portions each of which couples the second support and a given first support among the first supports,
   wherein each of the sensing blocks is disposed in a region that is surrounded by (i) the given first supports that are next to each other, (ii) the coupling portion and a given frame that are used to couple the given first supports, and (iii) the second support.

6. The sensor chip according to claim 5, wherein each of the multiple sensing blocks includes three T-patterned beam structures.

7. The sensor chip according to claim 6, wherein the three T-patterned beam structures include
   the two T-patterned beam structures in which a given connection portion is disposed between the first detections beams of the two T-patterned beam structures, and
   one T-patterned beam structure in which a corresponding first detection beam is parallel to second detection beams in the two T-patterned beam structures, and
   wherein the first detection beam in the one T-patterned beam structure is disposed between the given connection portion and the second support.

8. The sensor chip according to claim 1, wherein the six axes include
   a Z axis referring to a thickness direction of the T-patterned beam structure, and
   a Y axis and X axis that are perpendicular to the Z axis, and
   wherein the strain-detecting elements include
   multiple strain-detecting elements for detecting displacements in an X-axis direction and a Y-axis direction that are each disposed on a given first detection beam, and
   multiple strain-detecting elements for detecting a displacement in a Z-axis direction that are each disposed on a given second detection beam.

9. The sensor chip according to claim 8, wherein all of force point portions are configured to move in the same direction, in accordance with displacements in the X-axis direction and Y-axis direction.

10. The sensor chip according to claim 8, wherein the strain-detecting elements include
    multiple strain-detecting elements for detecting moments about the Z-axis direction that are each disposed on a given first detection beam, and
    multiple strain-detecting elements for detecting moments about the X-axis direction and Y-axis direction that are each disposed on a given second detection beam.

11. A force sensor device comprising:
    a sensor chip, the sensor chip including
       multiple sensing blocks each of which includes two or more T-patterned beam structures, each T-patterned beam structure including strain-detecting elements,
at least one first detection beam,
a second detection beam extending from the first detection beam in a direction perpendicular to the first detection beam;

multiple connection portions each of which is formed by coupling ends of second detection beams in respective T-patterned structures included in each of the sensing blocks, each connection portion including a force point portion; and a surrounding structure that surrounds perimeters of the multiple sensing blocks; and a strain inducing body configured to transmit at least one among an applied force and moment, to the sensor chip, wherein the sensor chip is configured to detect up to six axes relating to predetermined axial forces or moments around predetermined axes, based on a change in an output of each of the strain-detecting elements, the output of each strain-detecting element changing in accordance with an input applied to a given force point portion, wherein respective first detection beams in two T-patterned beam structures, among the two or more T-patterned beam structures, are parallel to each other, the first detection beam of each of the two T-patterned beam structures including a first end and a second end opposite the first end, and wherein the first detection beam in each of the two T-patterned beam structures is coupled to the surrounding structure at a corresponding first end and second end.

12. A sensor chip comprising:

multiple sensing blocks each of which includes two or more T-patterned beam structures, each T-patterned beam structure including
strain-detecting elements,
at least one first detection beam,
a second detection beam extending from the first detection beam in a direction perpendicular to the first detection beam; and multiple connection portions each of which is formed by coupling ends of second detection beams in respective T-patterned structures included in each of the sensing blocks, each connection portion including a force point portion, wherein the sensor chip is configured to detect up to six axes relating to predetermined axial forces or moments around predetermined axes, based on a change in an output of each of the strain-detecting elements, the output of each strain-detecting element changing in accordance with an input applied to a given force point portion, and wherein the first detection beam included in one T-patterned beam structure and the first detection beam included in another T-patterned beam structure are two beams that are paralleled to each other, and wherein the force point portion is disposed at a location away from the two beams and at an intermediate location between the two beams.

* * * * *